US012610928B2

(12) United States Patent
Bassett

(10) Patent No.: US 12,610,928 B2
(45) Date of Patent: Apr. 28, 2026

(54) FISHING LINE CONTROL SYSTEM

(71) Applicant: Jeffrey Paul Bassett, Manassas, VA (US)

(72) Inventor: Jeffrey Paul Bassett, Manassas, VA (US)

( * ) Notice: Subject to any disclaimer, the term of this patent is extended or adjusted under 35 U.S.C. 154(b) by 151 days.

(21) Appl. No.: 18/387,224

(22) Filed: Nov. 6, 2023

(65) Prior Publication Data

US 2024/0065241 A1 Feb. 29, 2024

Related U.S. Application Data

(63) Continuation-in-part of application No. 16/783,193, filed on Feb. 6, 2020, now Pat. No. 11,805,767.

(60) Provisional application No. 62/973,961, filed on Nov. 5, 2019, provisional application No. 62/918,614, filed on Feb. 8, 2019.

(51) Int. Cl.
A01K 87/04 (2006.01)
(52) U.S. Cl.
CPC .................................... A01K 87/04 (2013.01)
(58) Field of Classification Search
CPC ................................. A01K 87/04; A01K 91/06
See application file for complete search history.

(56) References Cited

U.S. PATENT DOCUMENTS

| | | | | |
|---|---|---|---|---|
| 1,709,436 A | * | 4/1929 | Koester | A01K 97/16 |
| | | | | 43/25 |
| 3,045,380 A | * | 7/1962 | Meredith | A01K 89/01 |
| | | | | 43/25 |
| 11,185,061 B2 | * | 11/2021 | Clayton | F16B 2/10 |

FOREIGN PATENT DOCUMENTS

| | | | | | |
|---|---|---|---|---|---|
| GB | 2283648 A | * | 5/1995 | ............. | A01K 87/00 |
| KR | 20200000337 U | * | 2/2020 | ............. | A01K 87/04 |
| KR | 20230066745 A | * | 5/2023 | ............. | A01K 87/04 |

* cited by examiner

*Primary Examiner* — Magdalena Topolski
(74) *Attorney, Agent, or Firm* — Yohannan Law; David R Yohannan

(57) ABSTRACT

A fishing device including a fishing rod and a line guide connected to the fishing rod. A moveable or pivoting lever may be disposed adjacent to the line guide. A fishing line braking surface may be disposed adjacent to the lever. The lever may be used to press the fishing line against the braking surface to slow or stop it from passing through the line guide. A finger control at the rod handle may be used to move the lever into a braking position.

20 Claims, 26 Drawing Sheets

FISHING LINE CONTROL SYSTEM

CROSS REFERENCE TO RELATED APPLICATIONS

This application is a continuation-in-part, and claims the benefit and priority, of U.S. Nonprovisional application Ser. No. 16/783,193 filed Feb. 6, 2020 and entitled Fishing Line Control System, the disclosure of which is hereby incorporated by reference herein in its entirety, and which application relates to and claims the priority of U.S. provisional patent application Ser. No. 62/918,614 that was filed Feb. 8, 2019 and entitled Spinbrak, and the priority of U.S. provisional patent application Ser. No. 62/973,961 that was filed Nov. 5, 2019 and entitled Spinbrak.

FIELD OF THE INVENTION

One or more embodiments of the present invention relate to systems and methods for controlling the passage of fishing line through a line guide.

BACKGROUND OF THE INVENTION

Current fishing rigs commonly include a flexible rod having a plurality of line guides through which a fishing line is threaded. The terminal end of the fishing line may be connected to some form of artificial or live bait and optional weights, while the opposite end of the fishing line may be connected to a reel. The reel may be connected to the rod, and the fishing line may be coiled on a spool connected to the reel. Line may be dispensed from the reel spool and recaptured as needed for casting and retrieving under the control of the fisherman according to known methods and using known systems.

There are a number of types of reels, and a number of types of fishing lines. With regard to reels, a fishing rig may include, for example, a spin cast reel, a bait cast reel, or a closed faced reel. With regard to fishing line, a rig may include, for example, braided line, including but not limited to so-called low memory line, multi-filament line, or solid filament line, all of which are available in various strengths, thicknesses, and/or weights. Fishing rods also vary, coming in various lengths, being collapsible or not, having various numbers of line guides, and being made of various types of materials. Regardless of the type of rod, reel, or line, however, it is imperative for the overall fishing rig to provide some ability to cast the line with both precision (i.e., with repeatable results) and accuracy (i.e., to a desired target).

Historically, many fisherman have used a reel bail or spool release to limit the release of line from the reel when attempting to cast to a desired location. Reel bails and spool releases typically have only two positions, a first closed position that prevents line from being freely released from the reel spool, and a second open position in which the line is essentially unhindered from being pulled off the spool. To initiate casting, the reel bail is opened or a spool release is activated while the line is held in place, normally by the fisherman's index finger or thumb. During the forward casting motion, the finger or thumb releases the line and the momentum of the bait and optional weights at the terminal end of the line draw the line off the spool until the bait hits a target or until the bail or spool release is closed. In order to control the flow of line off the spool, the fisherman may actuate the bail to attain a closed position or trigger the spool release to disengage before the bait hits a target, e.g., the water.

Tripping a bail or spool release to close from an open position is typically achieved by moving a reel handle in a rotary fashion. Movement of the reel handle may activate a latch that holds the bail or spool release open against the bias of a spring. Once tripped, bail or spool release actuation is typically very quick and not perfectly repeatable with each cast due to play in the reel mechanism. As a result of the speed of the bail or spool release closure and play in the reel, control of the passage of line from the reel spool may be somewhat unpredictable, and may brake the release of line from the spool too rapidly. Accordingly, it may be hard to control casting precisely and accurately so that the bait hits a desired target. The typical quick bail or spool release action may also result in a fishing line "jerking" effect that may further frustrate the fisherman's ability to precisely and accurately cast to a desired location. This jerking action can actually cause the bait to not only stop forward motion abruptly, but to spring back towards the fisherman in an uncontrolled and unpredictable manner depending on the amount of line dispensed and other line characteristics, such as line stretch or spring, rod flexibility, etc.

In view of the foregoing, there is a need for a fishing line control system that may provide precise and accurate casting. There is also need for a fishing line control system that can progressively brake the flow of line in a smooth, predicable, and controlled manner to avoid line "jerking" and place bait at a desired location. There is also a need for a line control system that provides the foregoing advantages without excessive pinching, stressing, stretching, or kinking of the line. Still further, there is a need for a line control system the does not add substantially to the complexity or weight of the overall fishing rig.

OBJECTS OF THE INVENTION

Accordingly, it is an object of some, but not necessarily all embodiments of the present invention to provide precise and accurate casting.

It is also an object of some but not necessarily all embodiments of the present invention to reduce line pinching, stressing and kinking as compared with known systems and rigs.

It is another object of some, but not necessarily all embodiments of the present invention to provide progressive braking of fishing line and reduce line "jerking" during casting.

It is yet another object of some, but not necessarily all embodiments of the present invention to provide a fishing line braking system that utilizes soft, compressible braking base pads and braking arm pads that are interchangeable and replaceable.

SUMMARY OF EMBODIMENTS OF THE INVENTION

Responsive to the foregoing challenges, Applicant has developed an innovative fishing device comprising: a fishing rod; a first line guide connected to the fishing rod in a fixed position relative to the fishing rod, said first line guide defining a first opening configured to permit fishing line to pass freely therethrough; a lever disposed adjacent to the first line guide, said lever extending from a lever pivot point connected to the fishing rod, said lever having a surface configured to engage the fishing line, and said lever being moveable relative to said first line guide and relative to the fishing rod; a line braking surface disposed adjacent to the lever; a bias device configured to bias the lever away from the line braking surface; and a control mechanism configured to pivot the lever about the lever pivot point and relative to the first line guide.

Applicant has further developed an innovative fishing line control system for installation on a fishing rod, said system comprising: a first line guide configured to be connected to the fishing rod in a fixed position relative to said fishing rod, said first line guide defining a first opening configured to permit fishing line to pass freely therethrough; a lever disposed adjacent to the first line guide, said lever configured to extend from a lever pivot point connected to said fishing rod, said lever having a surface configured to engage the fishing line, and said lever configured to be moveable relative to said first line guide; a line braking surface configured to be disposed adjacent to the lever; and a bias device configured to bias the lever away from the line braking surface.

Applicant has still further developed an innovative fishing line braking device comprising: a first line guide configured to be connected to the fishing rod in a fixed position relative to the fishing rod, said first line guide defining a first opening configured to permit fishing line to pass freely therethrough; a braking arm disposed adjacent to the first line guide, said braking arm extending from a pivot point connected to the fishing rod, said braking arm having a surface configured to engage the fishing line, and said braking arm being moveable relative to said first line guide and relative to the fishing rod; a removable base pad spaced from the braking arm, said removable base pad constructed of compressible material; a bias device configured to bias the braking arm away from the base pad; and a control mechanism configured to pivot the braking arm about the pivot point relative to the first line guide.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
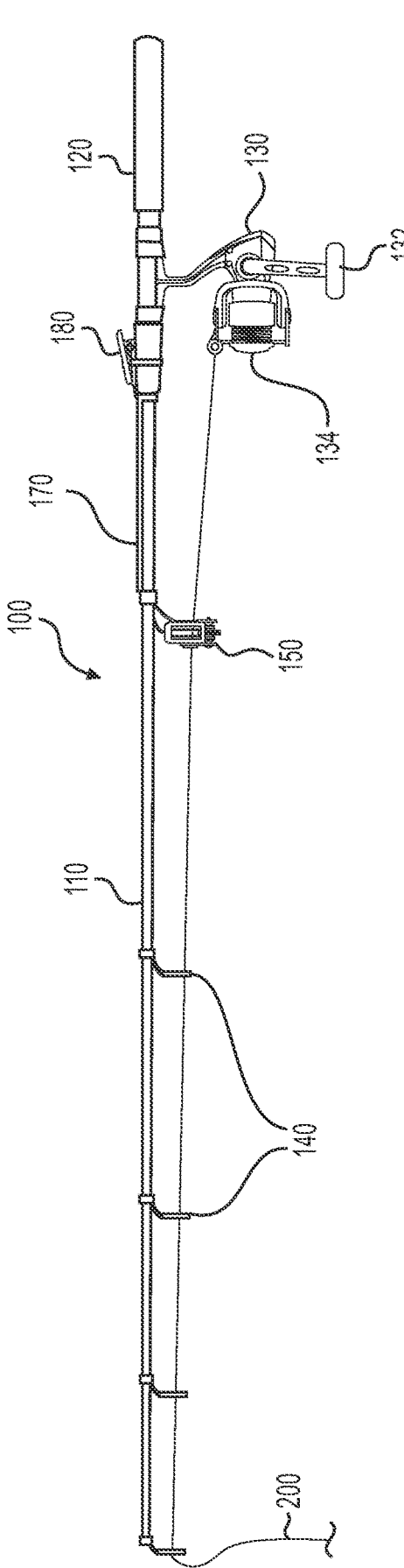
FIG. 1 is a side view of a fishing rig outfitted with a fishing line control system in accordance with embodiments of the invention.

Reference will now be made in detail to embodiments of the present invention, examples of which are illustrated in the accompanying drawings. With reference to FIG. 1, embodiments of the fishing line control system invention may be provided as a fishing rig 100. The rig 100 may include a rod 110 having a rod handle 120 at a base end. A reel 130 including a reel handle 132 and a spool 134 may be connected to the rod 110 adjacent to the rod handle 120. A plurality of line guides 140 may be connected to the rod 110 at spaced intervals. A line guide brake mechanism 150 may be connected to the rod 110 between the rod handle 120 and a line guide 140 that is most proximal to the rod handle 120. A control mechanism 180 for the line guide brake mechanism 150 may be provided on the rod 110 near or at the rod handle 120, and a control wire housing 170 may extend between the control mechanism and the brake mechanism. A fishing line 200 may be coiled on the spool 134. The fishing line 200 may have a terminal end that extends from the reel 130 and is threaded through the line guide brake mechanism 150 and each of the line guides 140.

Figure 2:
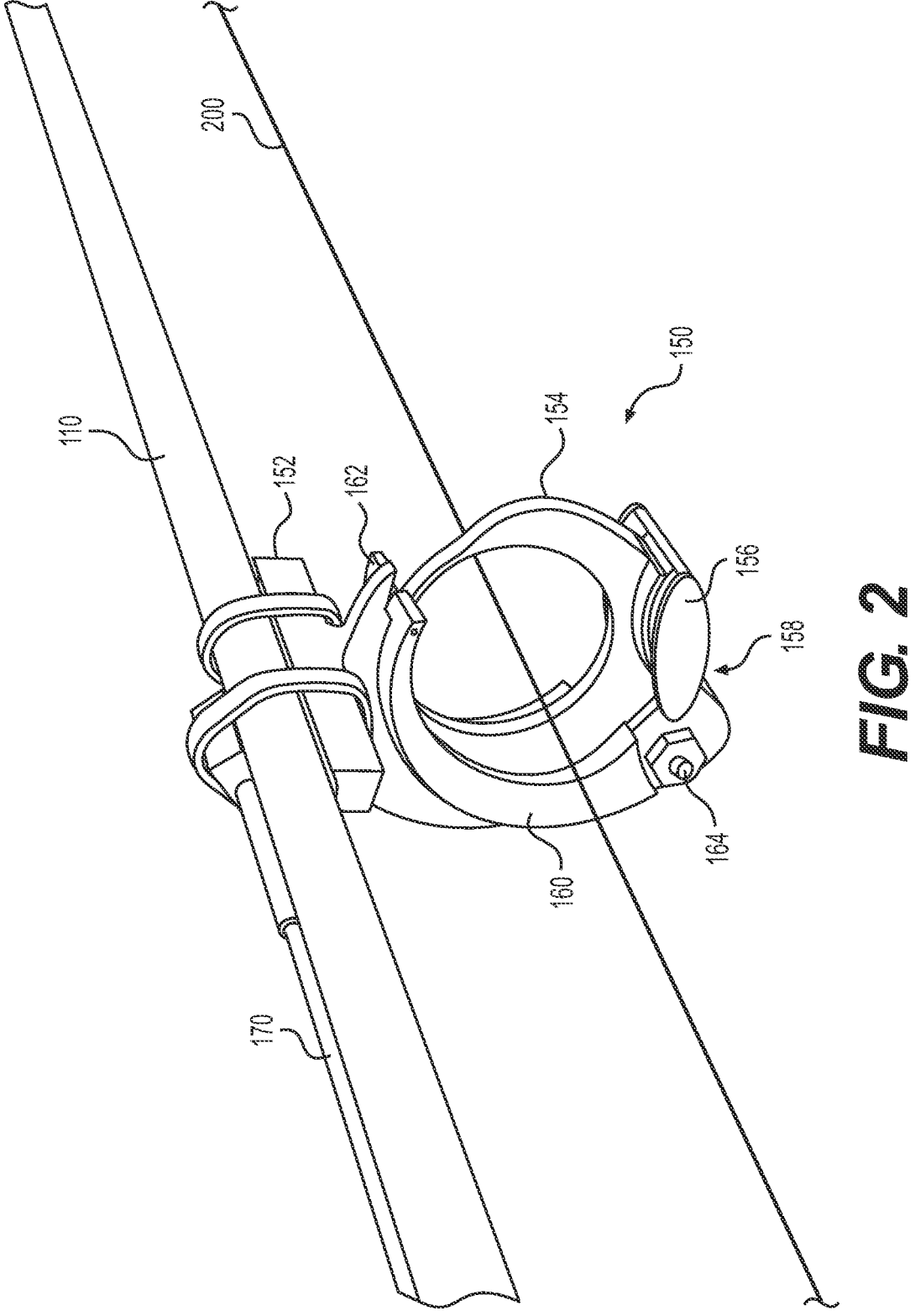
FIG. 2 is an isometric enlarged view of a brake mechanism in an open or non-braking position in accordance with a first embodiment of the fishing line control system invention.
Figure 3:
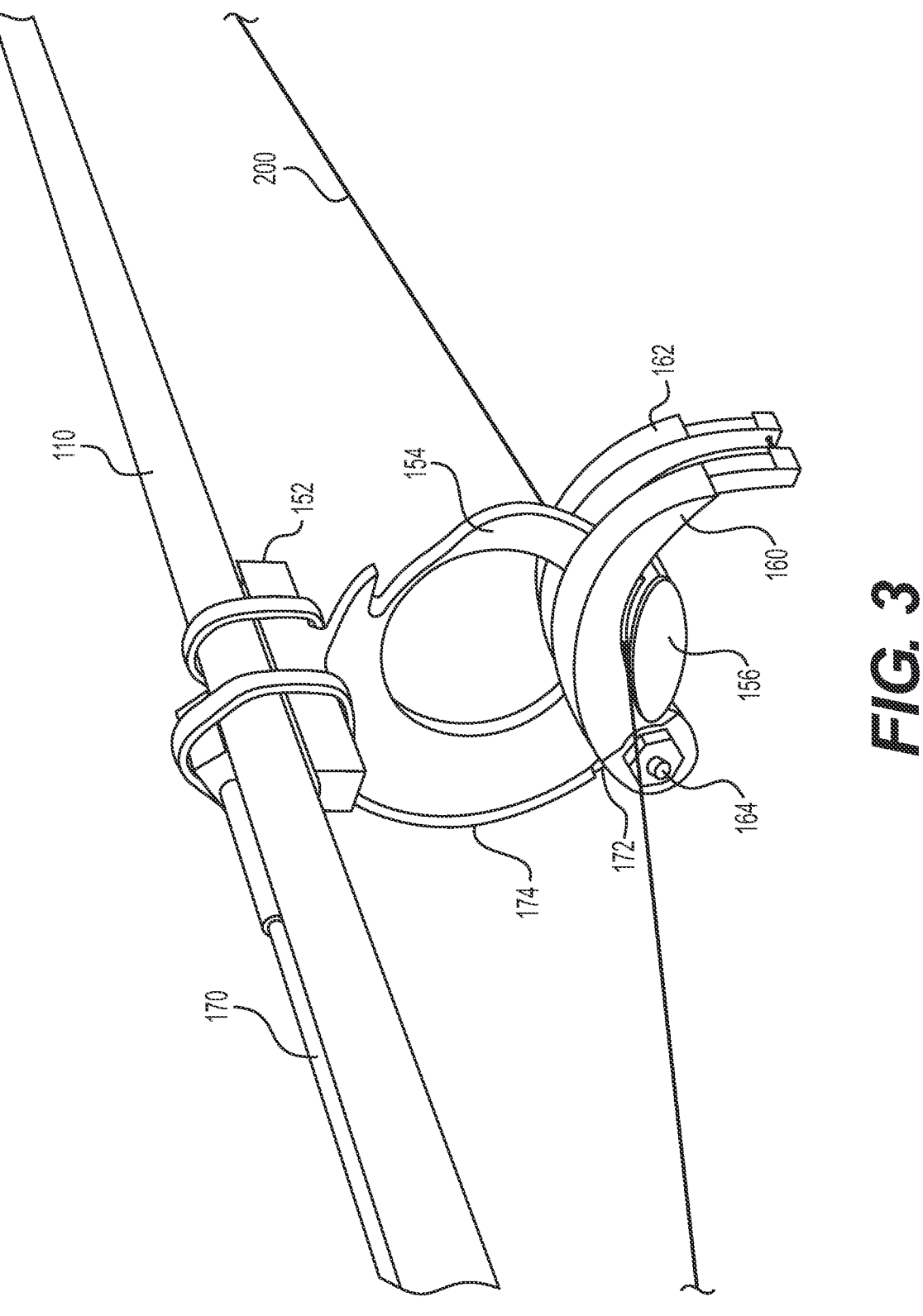
FIG. 3 is an isometric enlarged view of the brake mechanism in a closed or fully braking position in accordance with the first embodiment of the fishing line control system invention.

With reference to FIGS. 2 and 3, in which like reference characters refer to like elements, a line guide brake mechanism 150 provided in accordance with a first embodiment of the fishing line control system invention is illustrated. The brake mechanism 150 in accordance with the first embodiment of the invention is shown in an open or non-braking position in FIG. 2, and shown in a closed or fully braking position in FIG. 3.

The brake mechanism 150 shown in FIGS. 2 and 3 may include a base 152 connected to the rod 110 and a closed loop structure 154 forming a line guide incorporated into the brake mechanism. The closed loop structure 154 may define an opening configured to permit fishing line to pass freely therethrough. A line braking surface 156 may extend from, or be connected to, the closed loop structure 154. First and second braking levers 160 and 162 may be pivotally mounted on the closed loop structure 154 at a first lever pivot point 164 and a second lever pivot point (not shown), respectively. The control wire housing 170 may extend towards the first and second braking levers 160 and 162, and may extend from the brake mechanism 150 to the control mechanism 180 (shown in FIG. 1). The fishing line 200 may extend through the closed loop structure 154. A bias device (not shown), such as a torsion spring may be provided in the location indicated by reference numeral 158, to bias the first and second braking levers 160 and 162 into the position shown in FIG. 1, i.e., away from, or out of contact with, the line braking surface 156.

The closed loop structure 154 may be connected to the rod 110 so as to maintain a fixed position relative to the rod during use of the brake mechanism 150. The closed loop structure 154 may be provided relative to the rod 110 so that the opening it defines for the fishing line 200 is coplanar with a reference plane that is substantially perpendicular to a longitudinal axis of the rod. The closed loop structure 154 may include an enlarged lobe portion or portions at points where the line braking surface 156, the braking levers 160 and 162, and/or the base 152 extend from and/or are connected to the closed loop structure. Preferably the opening defined by the closed loop structure 154 is generally circular, however, it is appreciated in alternative embodiments that this need not be the case so long as the opening permits fishing line to pass through it relatively freely. A lower control wire housing 174 may extend from the control wire housing 170 on the rod 110 to a point near the braking levers 160 and 162. In the embodiment shown, the lower control wire housing 174 is provided along an outer rim of the closed loop structure 154, however this is not required for the device to operate properly. A control wire 172 may extend between the braking levers 160/162 through the lower control wire housing 174 and the control wire housing 170 to the control mechanism 180 (shown in FIG. 1).

The line braking surface 156 may extend from opposite sides of the closed loop structure 154 along a longitudinal axis that is substantially parallel to a longitudinal axis of the rod 110. The line braking surface 156 may have a curved upper surface shaped cooperatively to mate with, and/or have an inverse or negative image shape of, the inner surface of the braking levers 160 and 162. The braking surface 156, and/or the braking levers 160 and 162, may be constructed of material adapted to reduce wear, abrasion, stretching and/or kinking of the fishing line when the line is contacted by the braking levers and pressed against the braking surface, as explained below.

The braking surface 156 may also be constructed of material that has some "give" to provide a progressive braking effect. In yet another embodiment, the braking surface 156 may be mounted on the closed loop structure 154 by a biasing structure that biases the braking surface towards the closed loop structure and which "gives" to some degree when the braking levers 160 and 162 are pressed against the braking surface. In FIGS. 2 and 3, the portions of the braking surface 156 that extend from opposite sides of the closed loop structure 154 are shown to be mirror images of each other. However, this need not be the case. One of the sides of the braking surface 156 may be provided in an elevated position relative to the other so that contact between it and its mating braking lever 160 (or 162) occurs before contact between the other pair of braking surface and braking lever.

With continued reference to FIGS. 2 and 3, the braking levers 160 and 162 may be pivotally connected to opposite sides of the closed loop structure 154. A torsion spring, indicated at 158 may be mounted between the two levers. The braking levers 160 and 162 may have a curved inner and outer shape that generally aligns with or mimics the curvature of a portion of the closed loop structure 154. The shape of the braking levers 160 and 162 may be such that when they are in fully open positions, the closed loop structure 154 shields the fishing line 200 from being engaged in any respect by the braking levers. The first and second levers 160 and 162 may be connected at an end distal from the pivot point 164 by a stop. The closed loop structure 154 may include a notch formed in a location to engage the stop when the first and second levers 160 and 162 are in a fully open position, as shown in FIG. 2. As is evident from FIGS. 2 and 3, the closed loop structure 154 and the opening it defines may be coplanar with a first reference plane and the braking levers 160 and 162 may be configured to pivot within a second reference plane, wherein the first reference plane and the second reference plane are spaced apart and parallel to each other.

The braking levers 160 and 162 may also be constructed of material or otherwise be designed to have some "give" to provide a progressive braking effect. In yet another embodiment, the braking levers 160 and 162 may be mounted on the closed loop structure 154 by a biasing structure (e.g., the torsion spring) that biases the braking levers towards the braking surface 156 and which "gives" to some degree when the braking levers 160 and 162 are pressed against the braking surface. In FIGS. 2 and 3, the braking levers 160 and 162 that extend from opposite sides of the closed loop structure 154 are shown to be mirror images of each other. However, as with the braking surface 156, this need not be the case. One of the braking levers 160 or 162 may be provided in a slightly pivoted position relative to the other so that contact between it and its mating braking surface 156 occurs before contact between the other pair of braking surface and braking lever.

The embodiment of the invention shown in FIGS. 2 and 3 may be operated as follows, for example during a casting operation. With reference to FIGS. 1-4, the brake mechanism 150 may be maintained in the open, non-braking, position shown in FIG. 2 prior to and during the initial portion of a casting motion. When the fisherman desires to begin braking the passage of line 200 from the reel 130 (FIG. 1), she may use her digit to progressively depress the control mechanism shown in FIGS. 1 and 4 (or alternatively, shown in FIG. 12). Progressive depression of the control mechanism 180 may cause the control wire 172 to be pulled progressively towards the control mechanism and away from the brake mechanism 150. In turn, this may result in an equivalent amount of progressive rotation or pivoting of the braking levers 160 and 162 towards the braking surface 156 against the bias of the bias device. As the braking levers 160 and 162 progressively pivot, they first contact and then carry the fishing line 200 towards the braking surface 156. Contact between the braking levers 160 and 162 and the fishing line 200 provides an initial, low level of braking. To achieve a higher level of braking, the control mechanism 180 may be fully depressed to bring the braking levers 160 and 162, and the fishing line 200, into contact with the braking surface 156, as shown in FIG. 3, however this is not necessary for the brake mechanism 150 to effectively control casting to a target. When the cast is complete to the satisfaction of the fisherman, the control mechanism 180 may be released, which in turn may result in the braking levers 160 and 162 returning to the position shown in FIG. 2 under the influence of the bias device.

Figure 5:
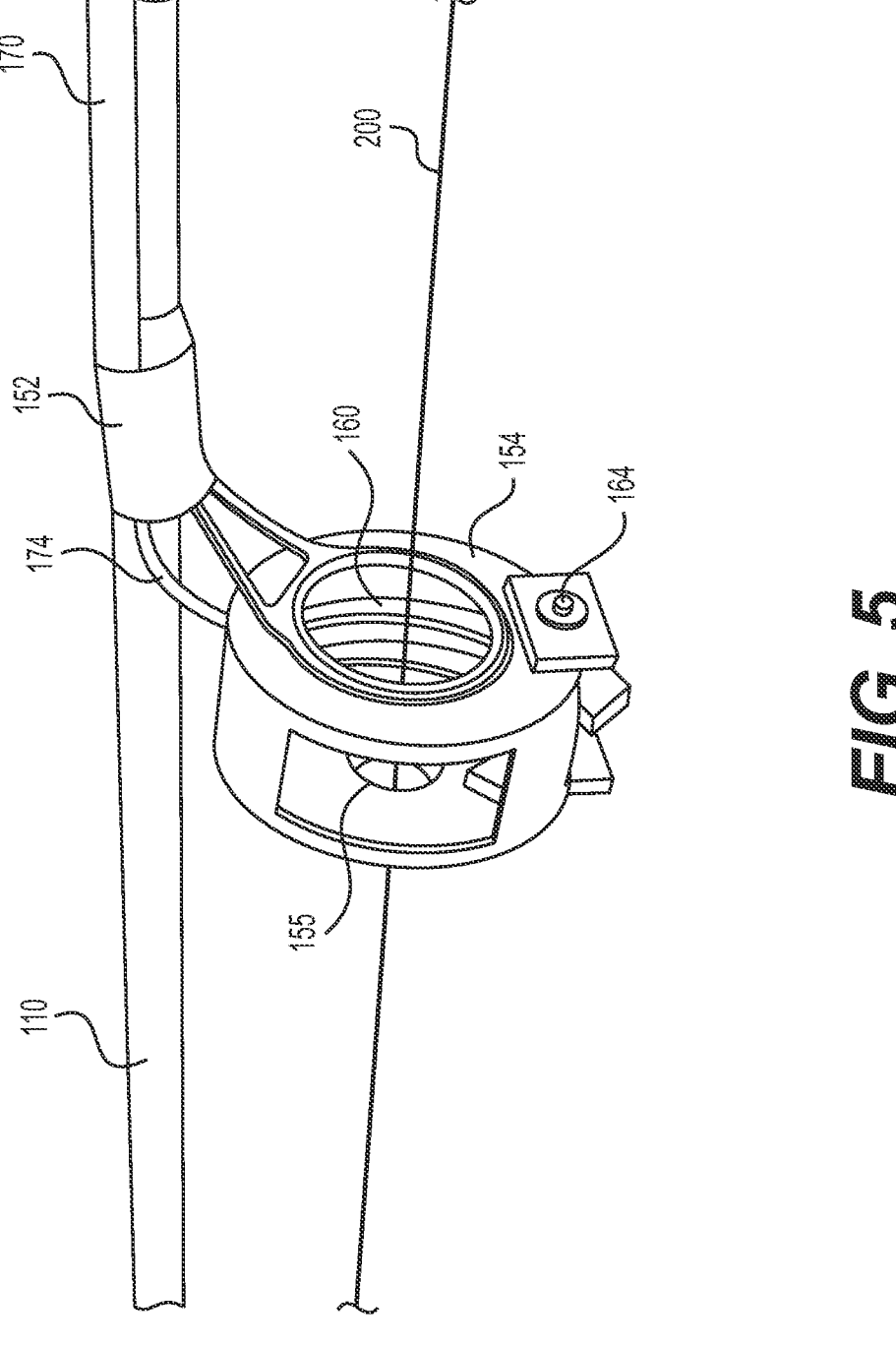
FIG. 5 is an isometric enlarged view of a brake mechanism in an open or non-braking position in accordance with a second embodiment of the fishing line control system invention.
Figure 6:
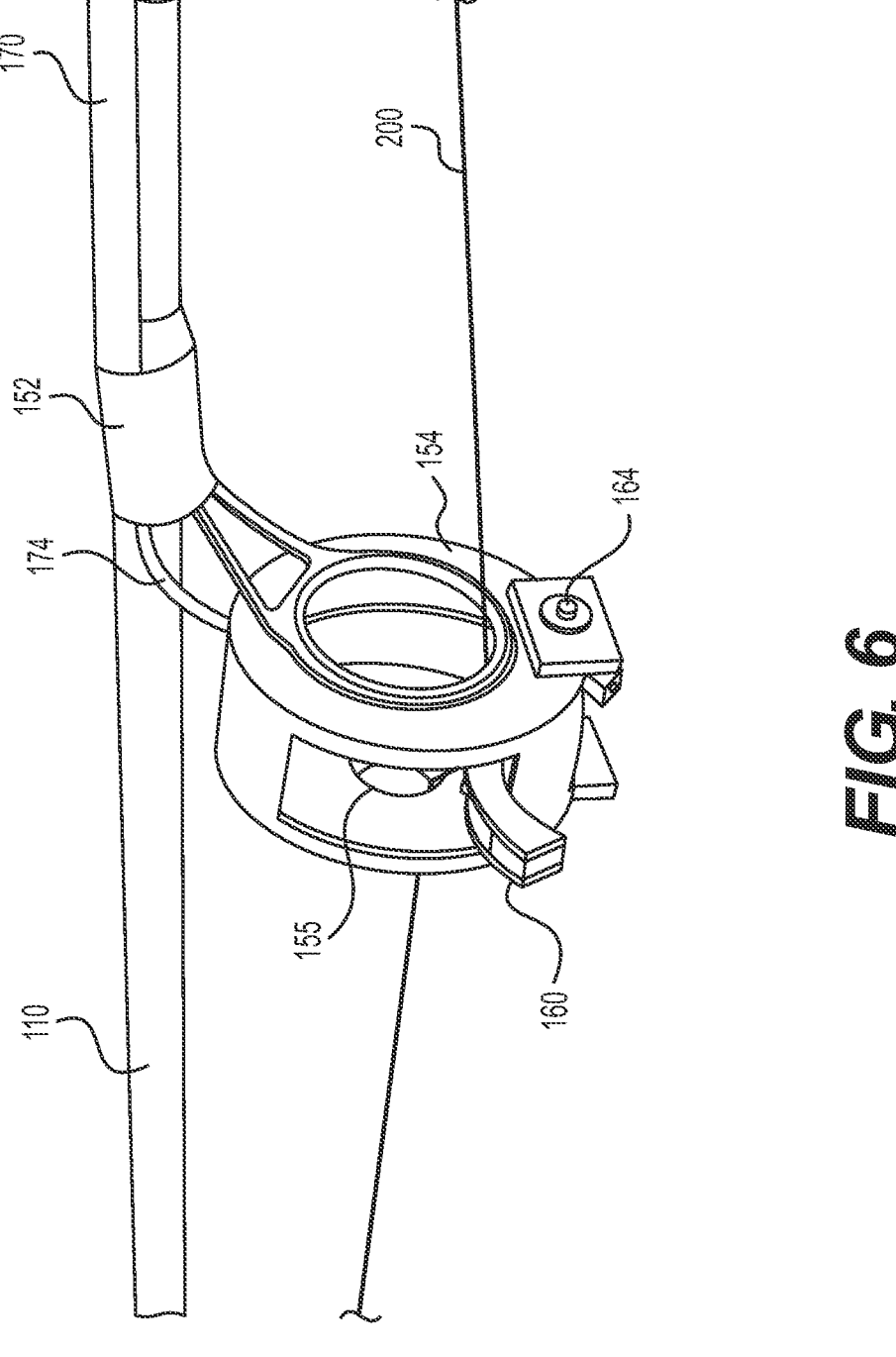
FIG. 6 is an isometric enlarged view of the brake mechanism in a closed or fully braking position in accordance with the second embodiment of the fishing line control system invention.

A second embodiment of the fishing line control system is illustrated in FIGS. 5 and 6 in which like reference characters refer to like elements in common with other embodiments. The brake mechanism in accordance with the second embodiment of the invention is shown in an open or non-braking position in FIG. 5, and shown in a closed or fully braking position in FIG. 6. With reference to these FIGS. 5 and 6, and as in the first embodiment, the brake mechanism shown may include a base 152 connected to the rod 110 and a first closed loop structure 154 forming a first line guide and a second closed loop structure 155 forming a second line guide, both incorporated into a common housing. The first closed loop structure 154 may define a first opening and the second closed loop structure 155 may define a second opening, both configured to permit fishing line 200 to pass freely therethrough. In the embodiment shown, the second opening is smaller than the first opening (e.g., for circular openings, the second opening has a smaller diameter than the first opening), and the second opening is distal from the reel 130 relative to the first opening. A line braking surface may be incorporated into the common housing. A first braking lever 160 may be pivotally mounted to the common housing at a first lever pivot point 164. The lower control wire housing 174 may extend towards the first braking lever 160, and the control wire housing 170 may extend from the brake mechanism 150 (FIG. 1) to the control mechanism 180 (FIG. 1). A bias device, such as a torsion spring may be provided to bias the first braking lever 160 into the position shown in FIG. 5, i.e., away from, or out of contact with, the line braking surface.

The embodiment of the invention shown in FIGS. 5 and 6 may be operated as follows. The brake mechanism may be maintained in the open, non-braking, position shown in FIG. 5 prior to and during the initial portion of a casting motion, for example. When the fisherman desires to begin braking the passage of line 200 from the reel 130 (FIG. 1), she may progressively depress the control mechanism (180, shown in FIGS. 1 and 12) causing the control wire to be pulled towards the control mechanism and away from the brake mechanism. In turn, the first braking lever 160 may pivot towards the braking surface inside the common housing against the bias of the bias device. Contact between the first braking lever 160 and the fishing line 200, and contact between the fishing line and the braking surface, as shown in FIG. 6, may slow or stop line from passing through the brake mechanism. The control mechanism may be selectively released, which in turn may result in the first braking lever 160 returning to the position shown in FIG. 5 under the influence of the bias device.

Figure 7:
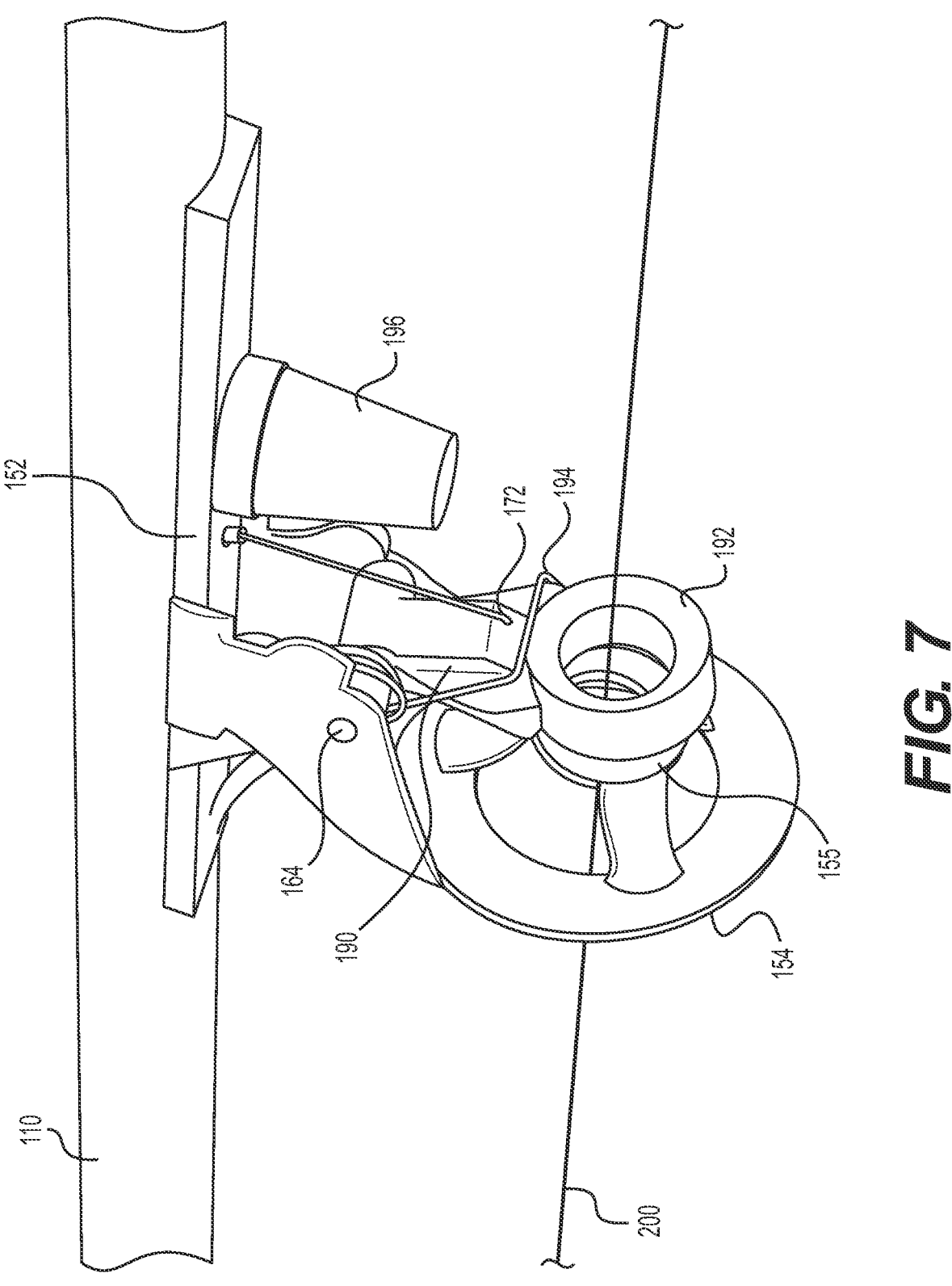
FIG. 7 is an isometric enlarged view of a brake mechanism in an open or non-braking position in accordance with a third embodiment of the fishing line control system invention.
Figure 8:
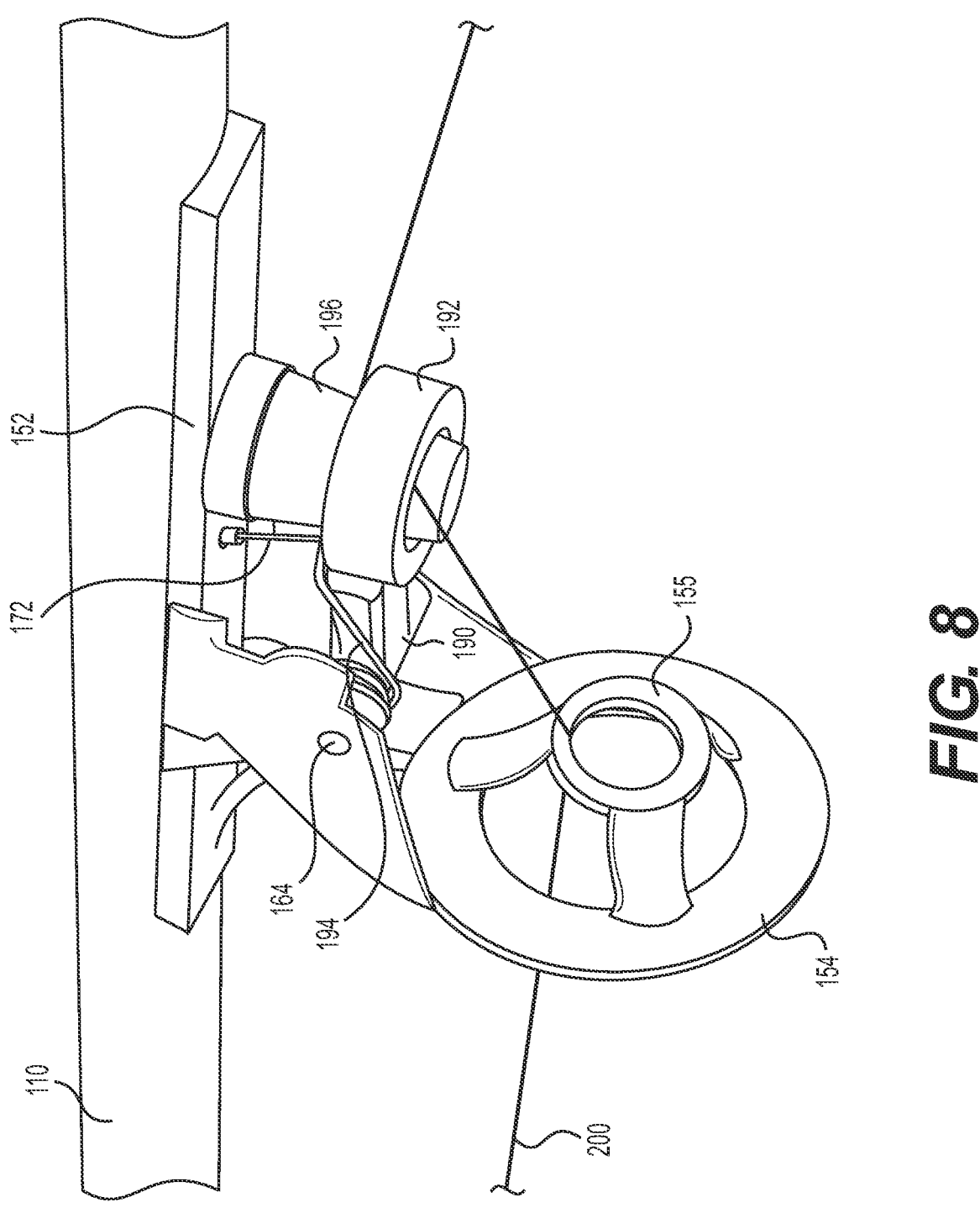
FIG. 8 is an isometric enlarged view of the brake mechanism in a closed or fully braking position in accordance with the third embodiment of the fishing line control system invention.

A third embodiment of the fishing line control system is illustrated in FIGS. 7 and 8 in which like reference characters refer to like elements in common with other embodiments. The brake mechanism in accordance with the third embodiment of the invention is shown in an open or non-braking position in FIG. 7, and shown in a closed or fully braking position in FIG. 8. With reference to these FIGS. 7 and 8, and as in the first and second embodiments, the brake mechanism may include a base 152 connected to the rod 110 and a first closed loop structure 154 forming a first line guide and a third closed loop structure 155 forming a third line guide, connected together. The first closed loop structure 154 may define a first opening and the third closed loop structure 155 may define a third opening, both configured to permit fishing line 200 to pass freely therethrough. In the embodiment shown, the third opening is smaller than the first opening (e.g., for circular openings, the third opening has a lesser diameter than the first opening), and the third opening is distal from the reel 130 relative to the first opening.

With continued reference to FIGS. 7 and 8, a line braking surface 196 may extend from the rod 110. The line braking surface 196 may be provided as a conical or frusto-conical structure, for example. A first braking lever 190 may be pivotally mounted in the brake mechanism; and the first braking lever may extend from a first lever pivot point 164. A second closed loop structure 192 forming a second line guide may be connected to, or integrally formed with, the first braking lever 190. The second closed loop structure 192 may define a second opening configured to permit fishing line 200 to pass freely therethrough. The first opening in the first closed loop structure 154 may be coplanar with a first reference plane and the first braking lever 190 may be configured to pivot within a second reference plane, where the first reference plane and the second reference plane are substantially perpendicular to each other. A bias device 194, such as a torsion spring, may bias the first braking lever 190 and second closed loop structure 192 away from the braking surface 196, out of contact with the line braking surface 196. The control wire 172 may extend from the first braking lever 190 to the control mechanism 180 (FIG. 1).

The embodiment of the invention shown in FIGS. 7 and 8 may be operated as follows. The brake mechanism may be maintained in the open, non-braking, position shown in FIG. 7 prior to and during the initial portion of a casting motion, for example. When the fisherman desires to begin braking the passage of line 200 from the reel 130 (FIG. 1), she may progressively depress the control mechanism (180, shown in FIGS. 1 and 12) causing the control wire to be pulled towards the control mechanism and away from the brake mechanism. In turn, the first braking lever 160 and the second closed loop structure 192 may pivot towards the braking surface 196 against the bias of the bias device 194. Contact between the second closed loop structure 192 and the fishing line 200, and contact between the fishing line and the braking surface, as shown in FIG. 8, may slow or stop line from passing through the brake mechanism. The control mechanism may be selectively released, which in turn may result in the first braking lever 160 returning to the position shown in FIG. 7 under the influence of the bias device.

Figure 9:
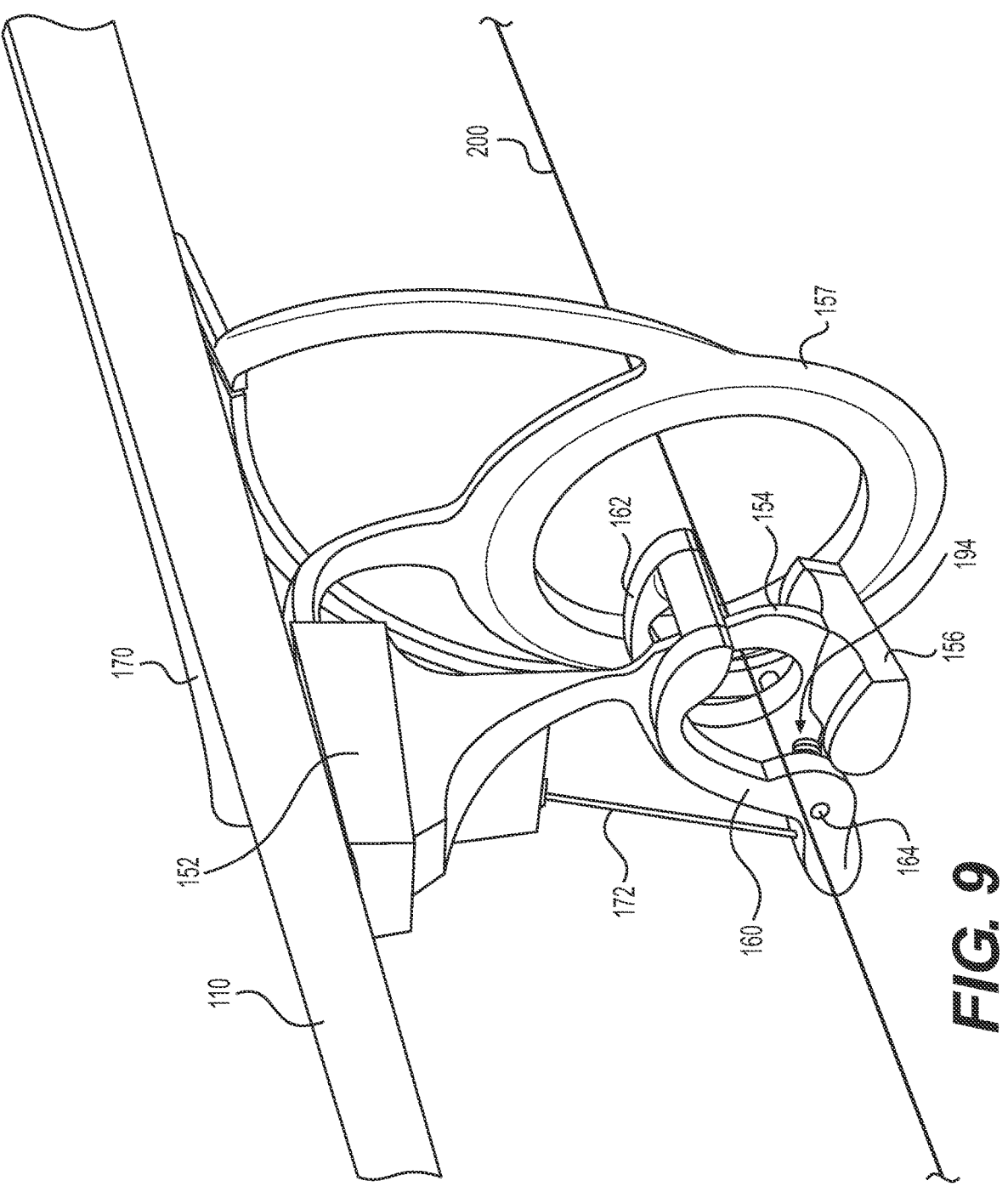
FIG. 9 is an isometric enlarged view of a brake mechanism in an open or non-braking position in accordance with a fourth embodiment of the fishing line control system invention.
Figure 10:
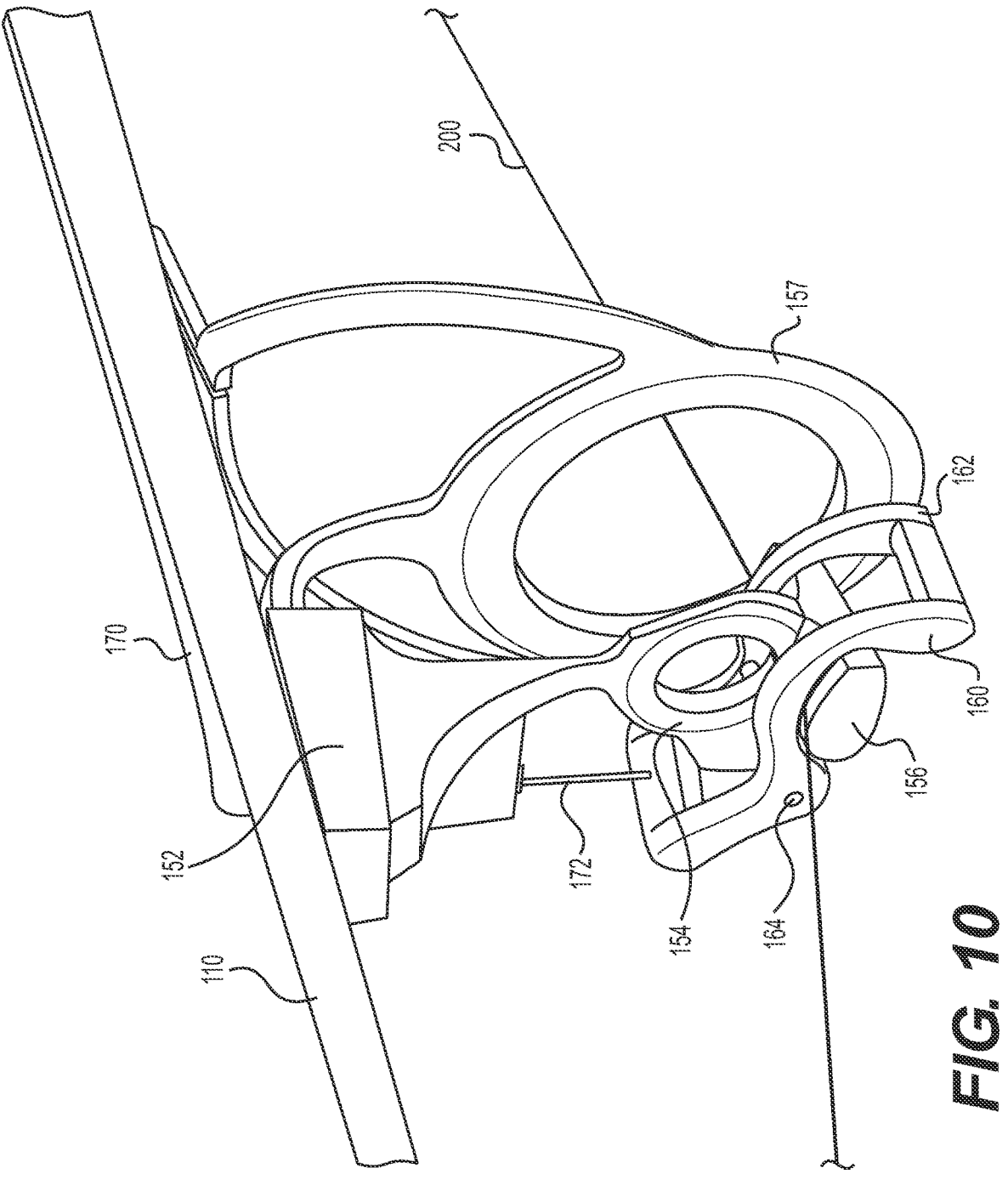
FIG. 10 is an isometric enlarged view of the brake mechanism in a closed or fully braking position in accordance with the fourth embodiment of the fishing line control system invention.

A fourth embodiment of the fishing line control system is illustrated in FIGS. 9 and 10 in which like reference characters refer to like elements in common with other embodiments. The brake mechanism in accordance with the fourth embodiment of the invention is shown in an open or non-braking position in FIG. 9, and shown in a closed or fully braking position in FIG. 10. With reference to these FIGS. 9 and 10, the fourth embodiment is very similar to the first embodiment of the invention shown in FIGS. 2 and 3. The brake mechanism shown in FIGS. 9 and 10 may include a base 152 connected to the rod 110 and a first closed loop structure 154 forming a line guide incorporated into the brake mechanism. The first closed loop structure 154 may define an opening configured to permit fishing line to pass freely therethrough. A line braking surface 156, which may have cupped or concave surfaces, may extend from, or be connected to, the first closed loop structure 154. First and second braking levers 160 and 162 may be pivotally mounted to the first closed loop structure 154 at a first lever pivot point 164 and a second lever pivot point, respectively. The control wire housing 170 may extend towards the first and second braking levers 160 and 162, and the control wire 172 may extend from the brake mechanism 150 through the control wire housing to the control mechanism 180 (shown in FIG. 1). A line guide 157 defining a second opening may be provided adjacent to the first closed loop structure 154. The fishing line 200 may extend through the first opening of the first closed loop structure 154 and the second opening of the line guide 157. In the embodiment shown, the first opening is smaller than the second opening (e.g., for circular openings, the first opening has a smaller diameter than the second opening), and the first opening is distal from the reel 130 relative to the second opening. A bias device 194, such as a torsion spring, may bias the first and second braking levers 160 and 162 into the position shown in FIG. 9, i.e., away from, or out of contact with, the line braking surface 156. The brake mechanism shown in FIGS. 9 and 10 may be operated in the same manner as the embodiment shown in FIGS. 2 and 3.

Figure 11:
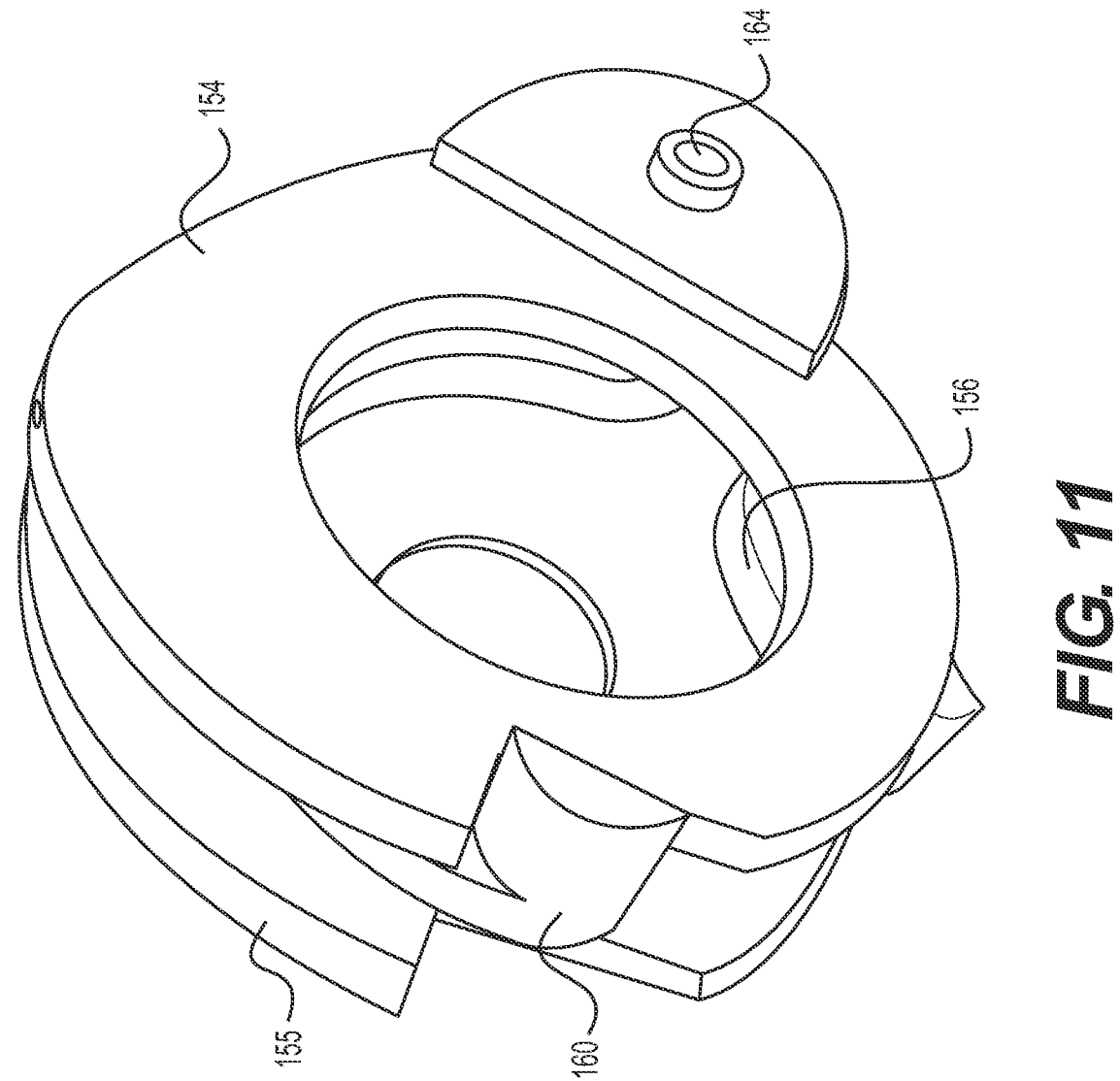
FIG. 11 is an isometric enlarged view of a brake mechanism in an open or non-braking position in accordance with a fifth embodiment of the fishing line control system invention.

A fifth embodiment of the fishing line control system is illustrated in FIG. 11 in which like reference characters refer to like elements in common with other embodiments. The brake mechanism in accordance with the fifth embodiment of the invention is shown in an open or non-braking position in FIG. 11. The fifth embodiment is very similar to the second embodiment of the invention shown in FIGS. 5 and 6. The brake mechanism shown in FIG. 11 may include a first closed loop structure 154 forming a first line guide and a second closed loop structure 155 forming a second line guide. The first closed loop structure 154 may define a first opening and the second closed loop structure 155 may define a second opening, both configured to permit fishing line to pass freely therethrough. In the embodiment shown, the second opening is smaller than the first opening (e.g., for circular openings, the second opening has a lesser diameter than the first opening), and the second opening is distal from the reel 130 (FIG. 1) relative to the first opening. A line braking surface 156 may be provided between the first closed loop structure 154 and the second closed loop structure 155. A first braking lever 160 may be pivotally mounted between the first closed loop structure 154 and the second closed loop structure 155 at a first lever pivot point 164. A bias device, such as a torsion spring, may be provided to bias the first braking lever 160 into the position shown in FIG. 11, i.e., away from, or out of contact with, the line braking surface 156. The first braking lever 160 may include a lateral extension or stop at an end distal from the pivot point 164. The first closed loop structure 154 may include a notch formed in a location to engage the stop when the first braking lever 160 is in a fully open position, as shown in FIG. 11. The brake mechanism shown in FIG. 11 may be operated in the same manner as the embodiment shown in FIGS. 5 and 6.

Figure 4:
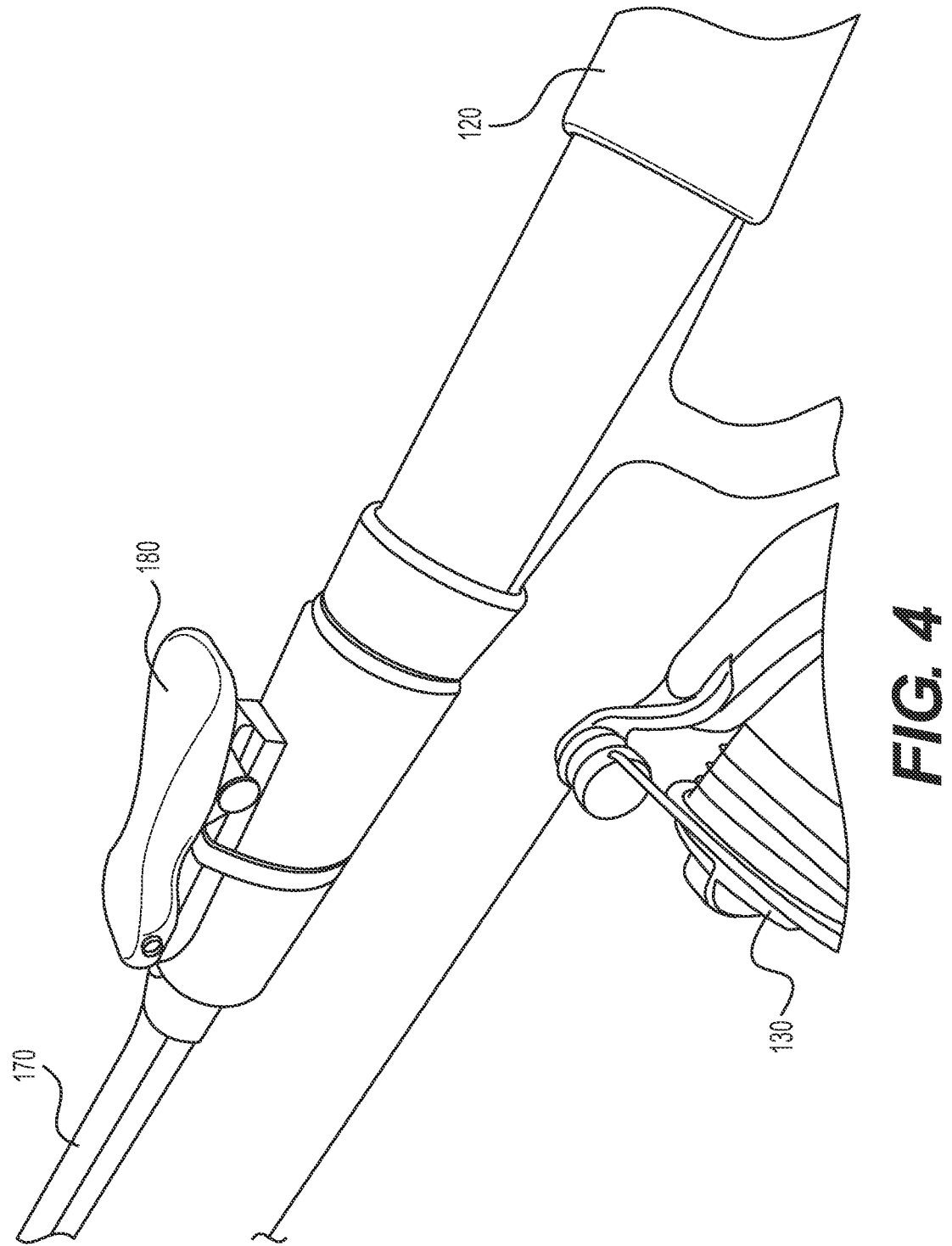
FIG. 4 is an isometric enlarged view of a control mechanism in accordance with embodiments of the fishing line control system invention.
Figure 12:
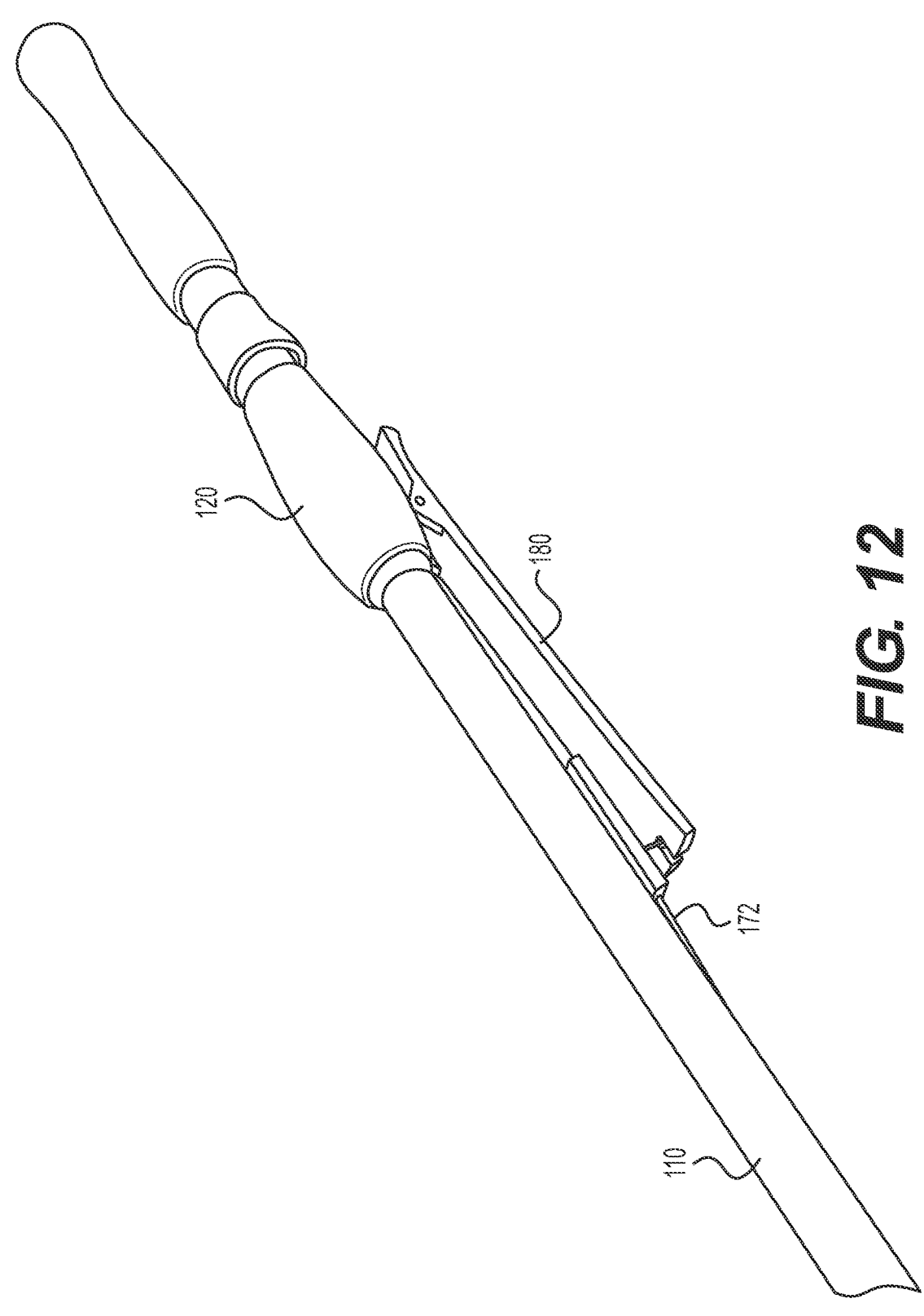
FIG. 12 is an isometric enlarged view of an alternative control mechanism in accordance with embodiments of the fishing line control system invention.

FIG. 12 illustrates an alternative control mechanism 180 that is mounted on the rod 110 near the handle 120 and which is finger operated as opposed to the thumb operated control mechanism shown in FIG. 4. Depressing the control mechanism 180 acts on the control wire 172 to pull the wire away from the brake mechanism (not shown).

Figure 13:
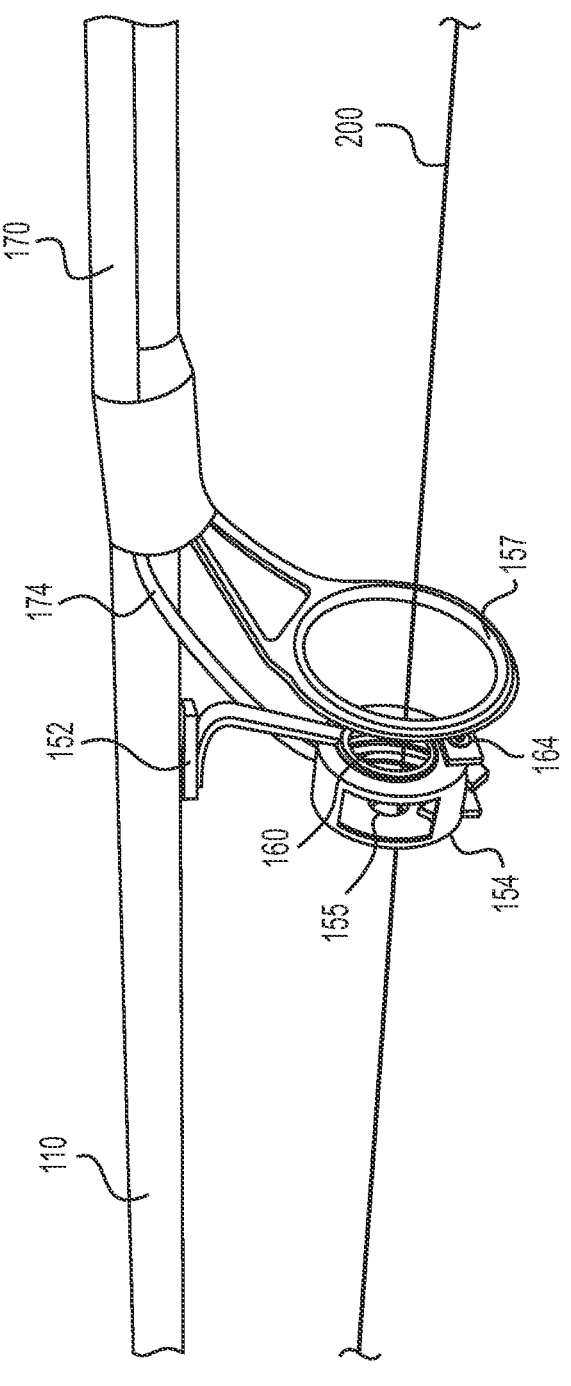
FIG. 13 is an isometric enlarged view of a brake mechanism in an open or non-braking position in accordance with a sixth embodiment of the fishing line control system invention.
Figure 14:
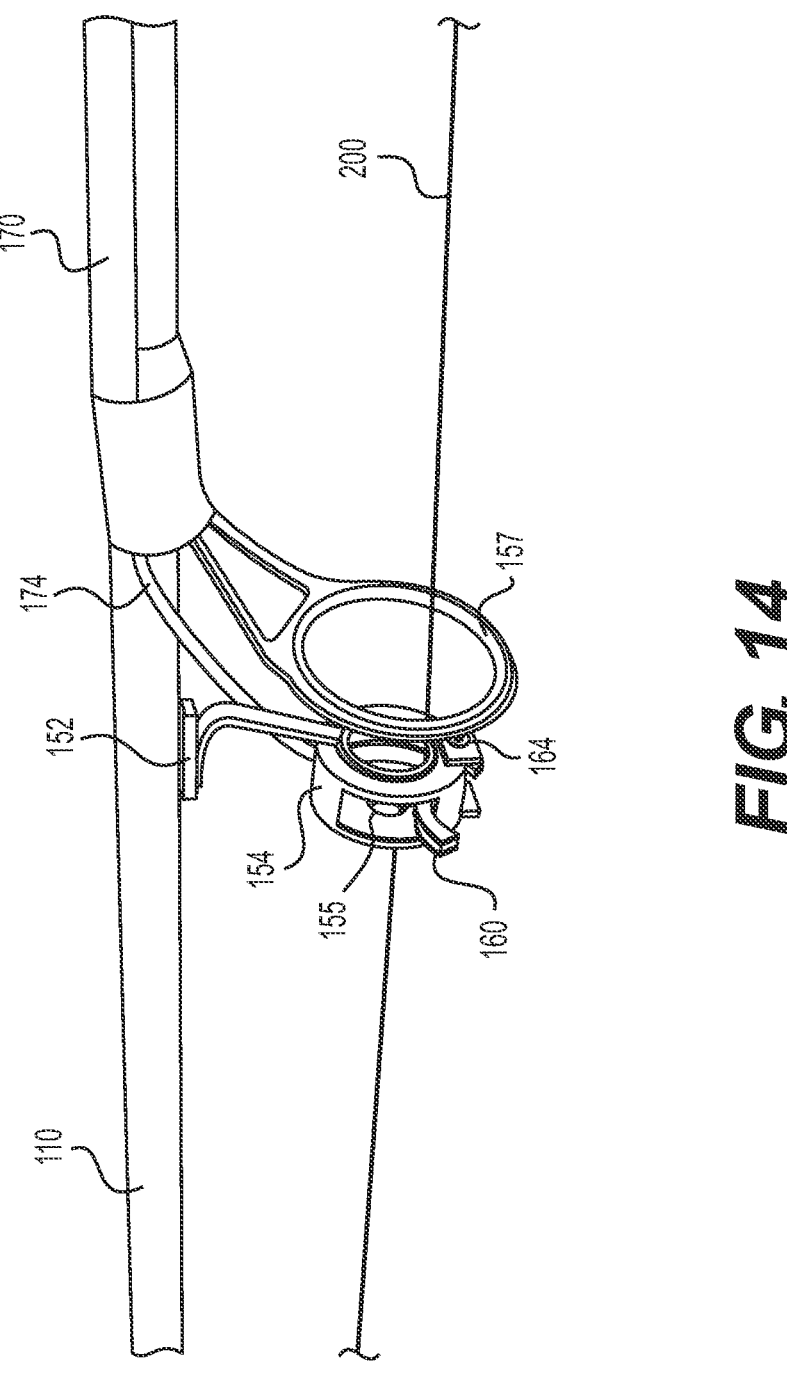
FIG. 14 is an isometric enlarged view of the brake mechanism in a closed or fully braking position in accordance with the sixth embodiment of the fishing line control system invention.

A sixth embodiment of the fishing line control system is illustrated in FIGS. 13 and 14 in which like reference characters refer to like elements in common with other embodiments. The brake mechanism in accordance with the sixth embodiment of the invention is shown in an open or non-braking position in FIG. 13 and in a closed or fully braking position in FIG. 14. The sixth embodiment is very similar to the second embodiment of the invention shown in FIGS. 5 and 6. With reference to these FIGS. 13 and 14, and as in the second embodiment, the brake mechanism may include a base 152 connected to the rod 110 and a first closed loop structure 154 forming a first line guide and a second closed loop structure 155 forming a second line guide, both incorporated into a common housing. The first closed loop structure 154 may define a first opening and the second closed loop structure 155 may define a second opening, both configured to permit fishing line 200 to pass freely therethrough. The second opening may be smaller than the first opening (e.g., for circular openings, the second opening has a lesser diameter than the first opening), and the second opening is distal from the reel 130 relative to the first opening. A line braking surface may be incorporated into the common housing. A first braking lever 160 may be pivotally mounted to the common housing at a pivot point 164. The lower control wire housing 174 may extend towards the first braking lever 160, and the control wire housing 170 may extend from the brake mechanism 150 (FIG. 1) to the control mechanism 180 (FIG. 1). A line guide 157 defining a third opening may be provided adjacent to the first closed loop structure 154. The fishing line 200 may extend through the first opening of the first closed loop structure 154, the second opening of the second closed loop structure 155, and the third opening of the line guide 157. A bias device, such as a torsion spring, may bias the first braking lever 160 into the position shown in FIG. 13, i.e., away from, or out of contact with, the line braking surface. The brake mechanism shown in FIGS. 13 and 14 may be operated in the same manner as the embodiment shown in FIGS. 5 and 6.

Figure 15:
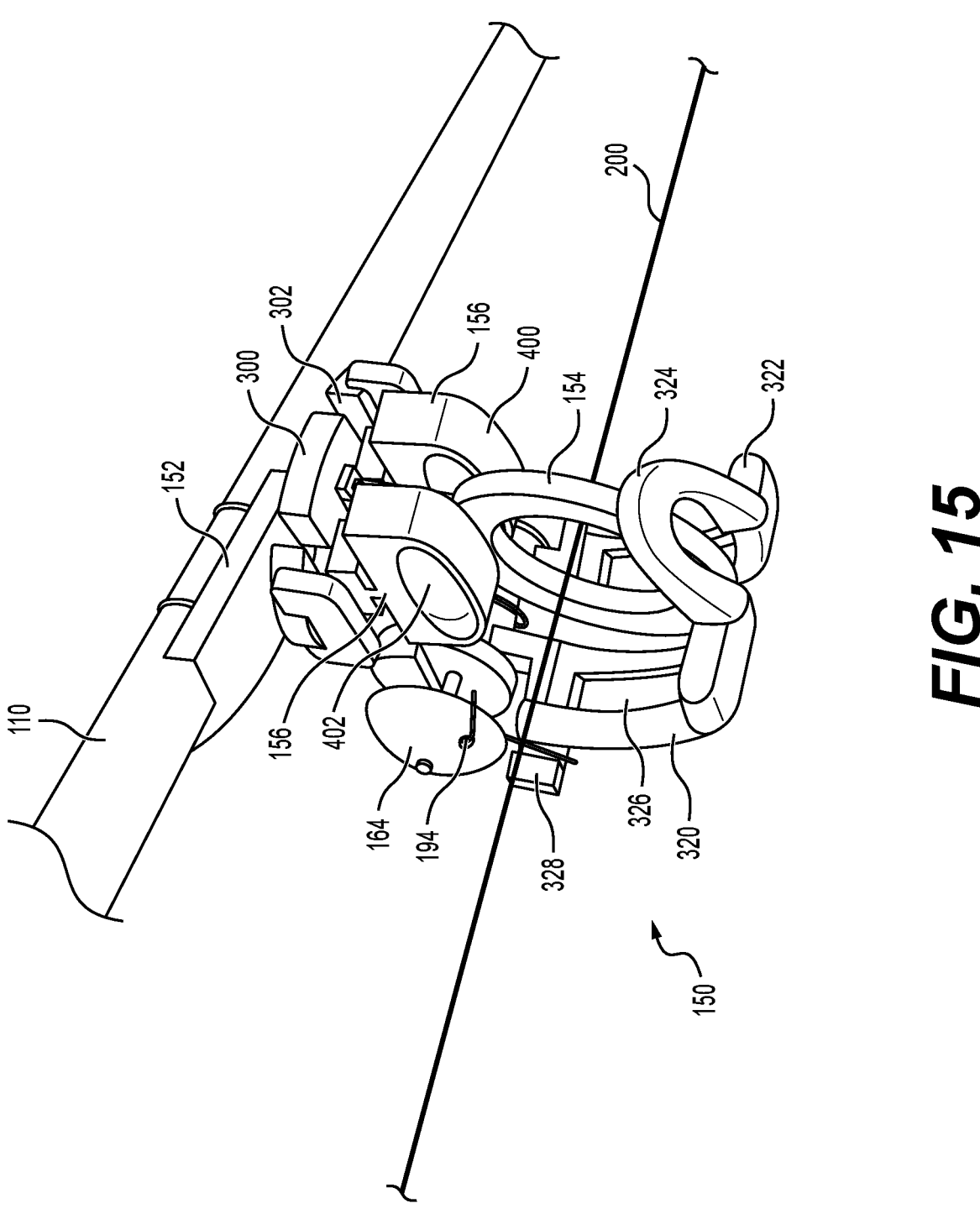
FIG. 15 is an isometric enlarged view of a brake mechanism in an open or non-braking position in accordance with an alternative embodiment of the fishing line control system invention.
Figure 16:
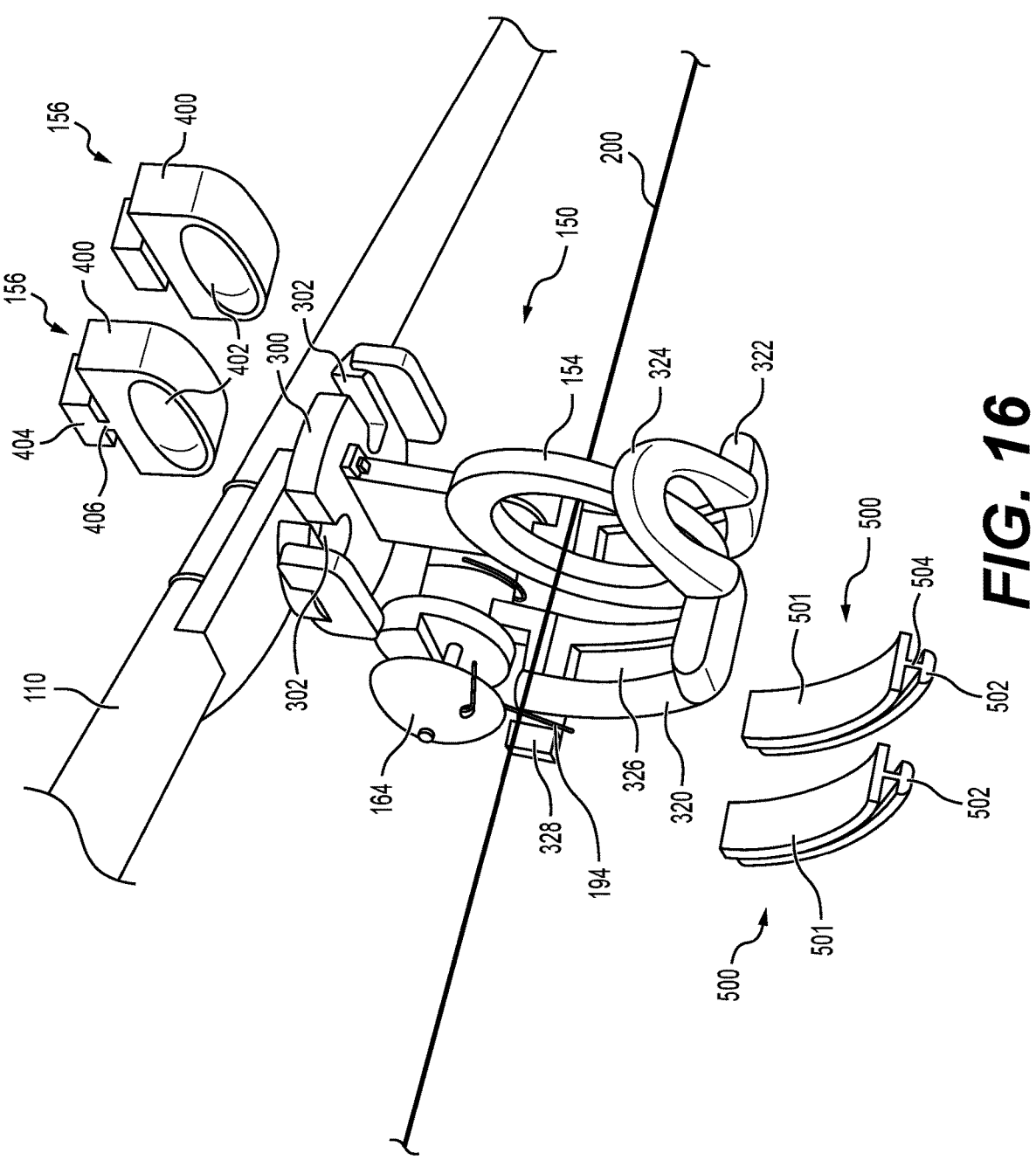
FIG. 16 is an isometric exploded view of the brake mechanism shown in FIG. 15 with the base pads and arm pads separated from the base pad connector and braking arms, respectively.
Figures 17, 18, 19:
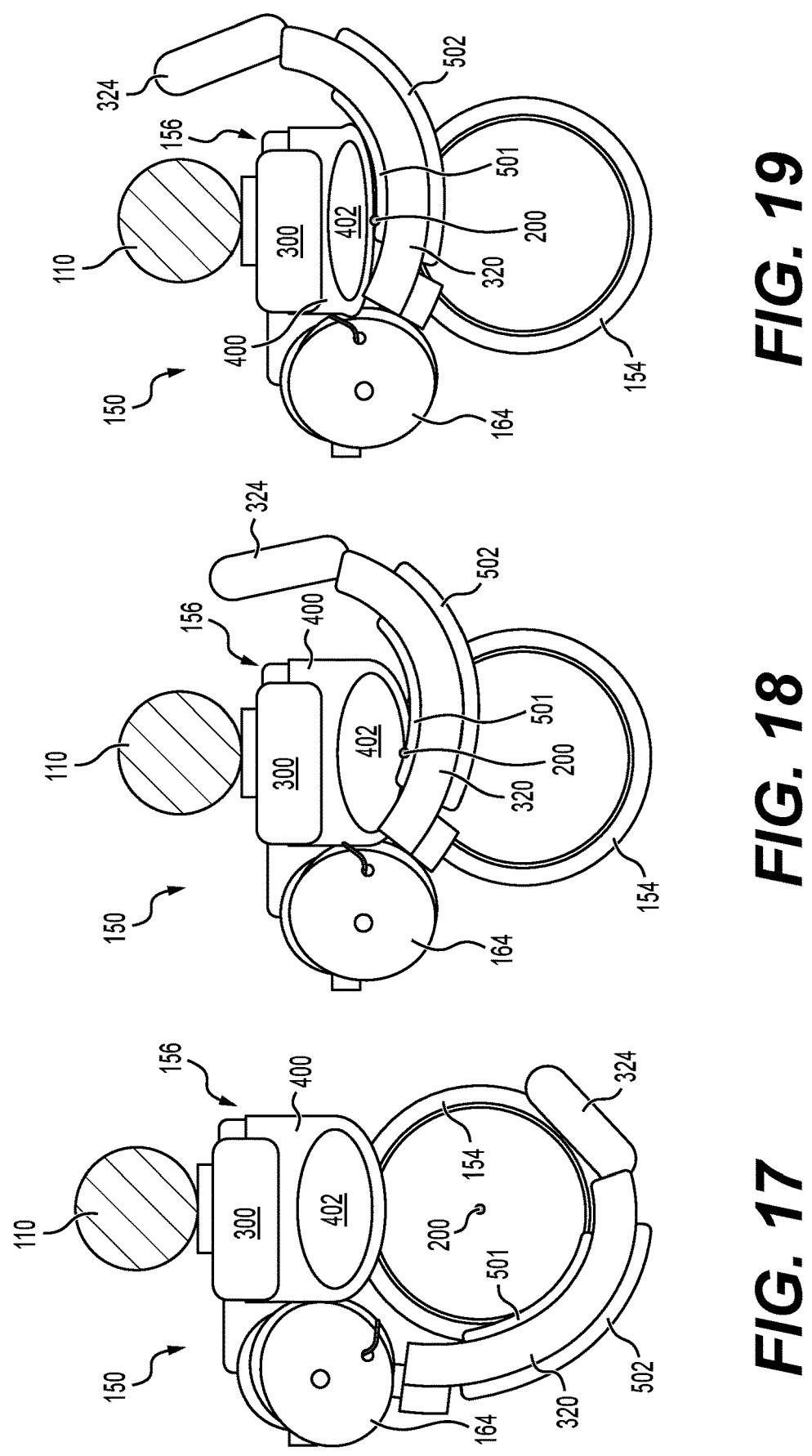
FIG. 17 is a side view of the brake mechanism shown in FIGS. 15-16 in an open or non-braking position.
FIG. 18 is a side view of the brake mechanism shown in FIGS. 15-17 in a position where the braking arm pad heads first contact the base pad heads.
FIG. 19 is a side view of the brake mechanism shown in FIGS. 15-17 in a position where the braking arm pad heads compress the base pad heads.

With reference to FIGS. 15-19, in which like reference characters refer to like elements, a line guide brake mechanism 150 provided in accordance with an alternative embodiment of the fishing line control system invention is illustrated. The brake mechanism 150 in FIGS. 15-19 is shown in an open or non-braking position in FIGS. 15-17, shown in a partially closed/partially braking position in FIG. 18, and shown in a fully closed or fully braking position in FIG. 19.

The brake mechanism 150 shown in FIGS. 15-19 may include a base 152 connected to the rod 110 and a closed loop structure 154 forming a line guide incorporated into the brake mechanism. The closed loop structure 154 may extend downward from the base 152 or the base pad connector 300, and may define an opening configured to permit fishing line to pass freely therethrough. The closed loop structure 154 may be connected to the rod 110 so as to maintain a fixed position relative to the rod 110 during use of the brake mechanism 150. The closed loop structure 154 may be provided relative to the rod 110 so that the opening it defines for the fishing line 200 is coplanar with a reference plane that is substantially perpendicular to a longitudinal axis of the rod. Preferably the opening defined by the closed loop structure 154 is generally circular, however, it is appreciated in alternative embodiments that this need not be the case so long as the opening permits fishing line to pass through it relatively freely.

Line braking surfaces may be provided in the form of base pads 156 disposed on opposite sides of the closed loop structure 154. Preferably, the lower most surface point of the base pads 156 extends noticeably beyond the upper most rim portion of the closed loop structure 154, but noticeably short of the center of the open loop structure. Each base pad 156 may include a base pad head 400 having a central opening 402 extending therethrough, a base pad foot 404, and a base pad neck 406 connecting the base pad head to the base pad foot. The base pad connector 300 may include outer and inner wings which extend downward and lend support to the base pads 156. Each base pad head 400, base pad foot 404 and base pad neck 406 may be sized and shaped so as to slide into, and seat securely within, complementarily shaped base pad slots 302 provided in the base pad connector 300. As a result, the base pads may be easily removed for replacement with a new base pad, or exchanged with a different type of base pad in terms of material, size and/or shape. The central opening 402 of each base pad 156 preferably may be oval-shaped, however other shapes, such as circular, rectangular, or irregular are possible and considered within the scope of the claimed invention.

The base pads 156 may extend downward from the base pad connector 300 on opposite sides of the closed loop structure 154 and may be aligned with each other along a longitudinal axis that is substantially parallel to a longitudinal axis of the rod 110. The base pads 156 may be constructed of deformable material such as, for non-limiting examples, flexible silicone and urethane rubbers having a Shore A hardness in the range of approximately 20 A to 70A on a Durometer. It is appreciated that both natural and synthetic rubbers of any type having a similar hardness may be used. For a non-limiting example, materials such as neoprene, nitrile, butyl and the like may be used. Indeed, the base pad material may be constructed from any medium soft rubber or rubber-like material that has the necessary chemical and heat resistant qualities, and that has a suitable memory characteristic that causes the base pads to quickly return to their pre-deformation shape after being compressed. The compression/deformation characteristics of the base pads 156 may be selected by varying the size/width of the base pad heads 400, varying the size and shape of the central openings 402, and/or varying the material used to construct the base pads.

Curved inner and outer braking arms 320 and 322 may be pivotally mounted on and extend from the base 152 or base pad connector 300 along a pivot axis 164. The inner and outer braking arms 320 and 322 may be connected together by a bridge 324 that is integrally formed with the braking arms. The inner and outer braking arms 320 and 322 may be constructed of any sufficiently rigid and tough material such as, but not limited to, a metal, plastic or composite material frame having a hard polished plastic, ceramic or composite material surface for contact with the fishing line. The bridge 324 may be generally U-shaped to accommodate the closed loop structure 154 during the pivoting motion of the inner and outer braking arms 320 and 322. The inner and outer braking arms 320 and 322 may each include a braking arm slot 326 configured to receive an arm pad 500. Each optional arm pad 500 may include an arm pad head 501, an arm pad foot 502 and an arm pad neck 504 connecting the arm pad head to the arm pad foot. Each arm pad head 501, arm pad foot 502 and arm pad neck 504 may be sized so that the arm pad 500 seats securely within a complementarily shaped braking arm slot 3326 provided in the braking arms. Each base pad head 400 may have a curved lower surface shaped cooperatively to mate with, nest with, and/or have an inverse or negative image shape of, the curved inner surface of the inner and outer braking arms 320 and 322 or the curved inner surface of the arm pad heads 501.

As with other embodiments of the invention, a control wire housing 170 may extend from the brake mechanism 150 to the control mechanism 180 (shown in FIG. 1). A bias device 194, such as a torsion spring may bias the inner and outer braking arms 320 and 322 into the position shown in FIGS. 15-17, i.e., away from, or out of contact with, the base pads 156 by exerting a force against a braking arm boss 328. Manipulation of the control mechanism 180 (FIG. 1) may be used to pivot the inner and outer braking arms 320 and 322 against the biasing force of the bias device 194 as shown in FIGS. 18 and 19. As is evident from FIGS. 15-16, the closed loop structure 154 and the opening it defines may be coplanar with a first reference plane and the inner and outer braking arms 320 and 322 may be configured to pivot within second and third reference planes, respectively, wherein the first reference plane, the second reference plane and the third reference plane are all spaced apart and parallel to each other.

The arm pads 500 may be constructed of like material to that used for the base pads 156 so that both sets of pads are compressible to provide a progressive braking effect. Alternatively, the arm pads 500 may include a hard rubber, polished plastic, ceramic or composite material surface. In FIGS. 15-19, the base pads 156 and the arm pads 501 provided on opposite sides of the closed loop structure 154 are shown to be sets of identical elements. However, this need not be the case. One of the base pads 156 may be provided in an elevated position relative to the other so that contact between it and its mating braking arm 320 (or 322)

or mating arm pad 501 occurs before contact between the other pair of base pad and braking arm or arm pad. Similarly, the inner and outer braking arms 320 and 322 that extend from opposite sides of the closed loop structure 154 are shown to be mirror images of each other. However, as with the base pads 156, this need not be the case. One of the braking arms 320 or 322 may be provided in a slightly pivoted position relative to the other so that contact between it and its mating base pad 156 occurs before contact between the other pair of base pad and braking arm.

Figure 20:
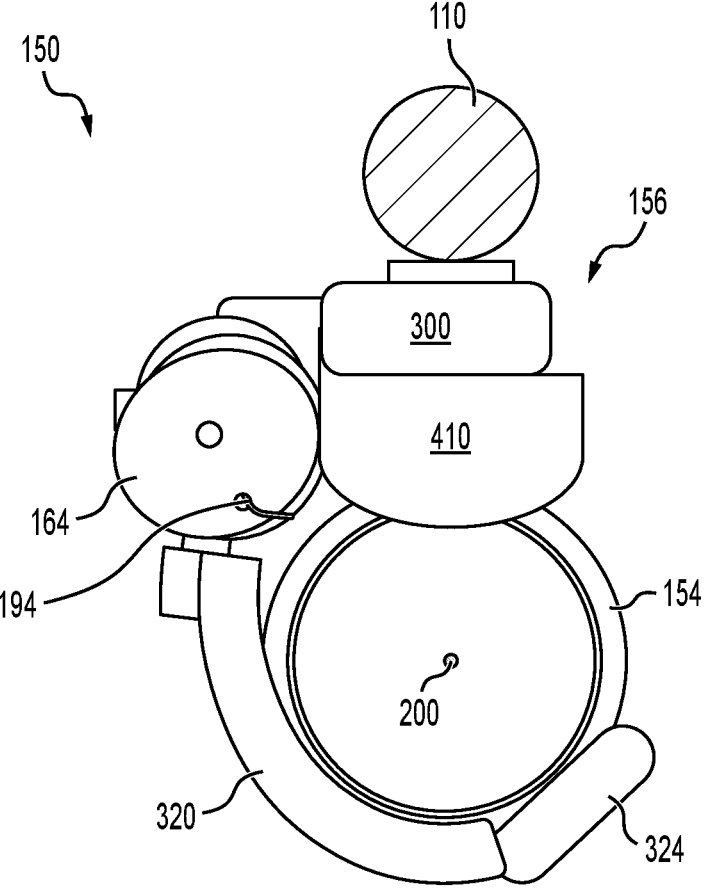
FIG. 20 is a side view of a brake mechanism having at least one base pad with a solid pad head in accordance with an alternative embodiment of the fishing line control system invention.
Figure 25:
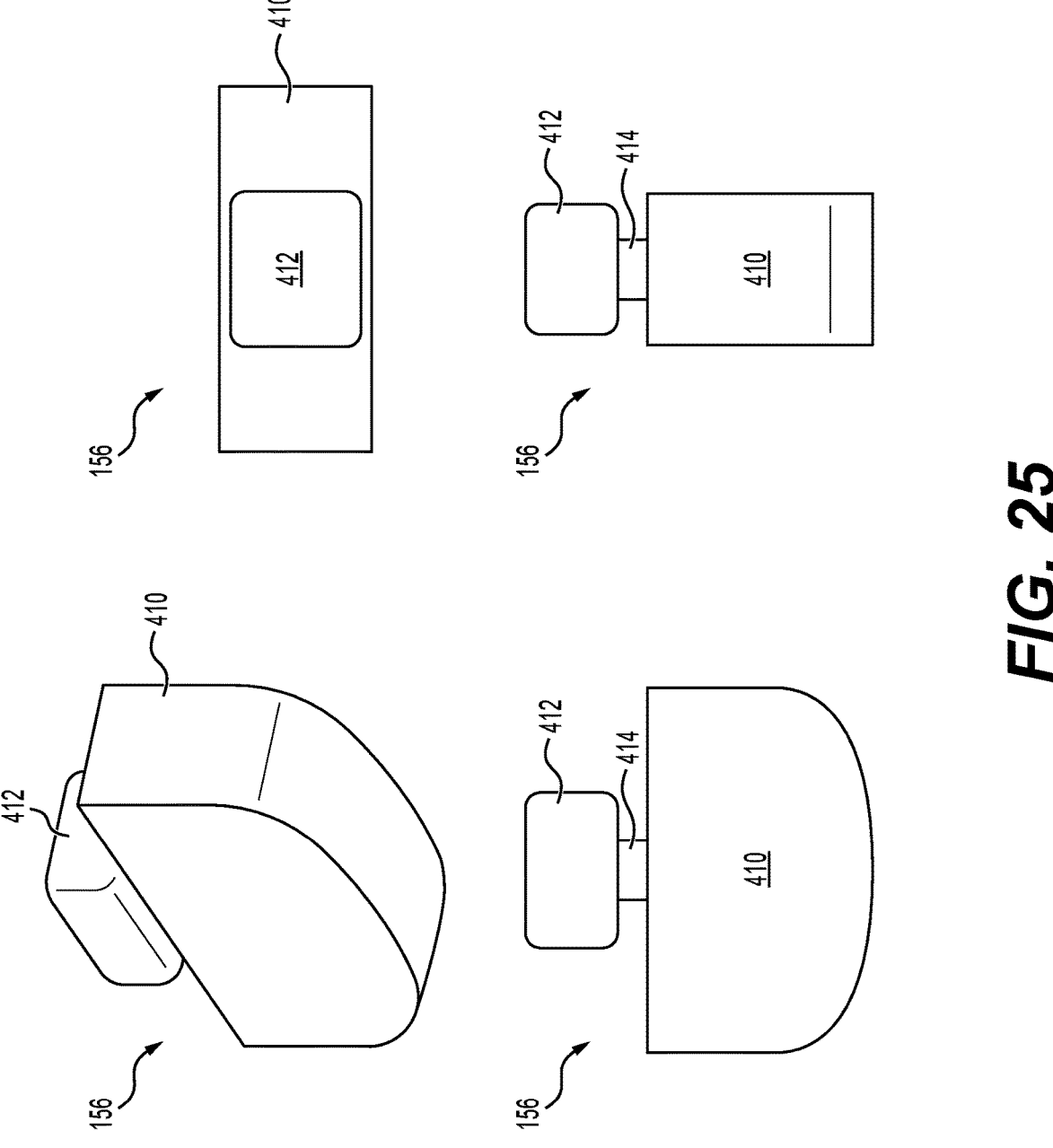
FIG. 25 are isometric, top, side and front views of an alternative base pad having a solid pad head.

With reference to FIGS. 20 and 25, in which like reference characters refer to like elements in common with other embodiments, an alternative embodiment of the invention to that shown in FIGS. 15-19 is shown. In FIGS. 20 and 25, the brake mechanism 150 is shown in an open or non-braking position relative to the fishing line 200. The base pad connector 300 is suspended below the rod 110, to which it is connected. One or two base pads 156 may be connected to the base pad connector 300. One or two braking arms 320 may be pivotally connected to the pivot point 164 and may be biased into the open position by a bias device 194. The base pad 156 may include a solid base pad head 410 connected to a base pad foot 412 by a base pad neck 414. Additionally, the inner braking arm 320 (and outer braking arm 322, not shown) may contact the base pad 156 directly without an arm pad.

Figure 21:
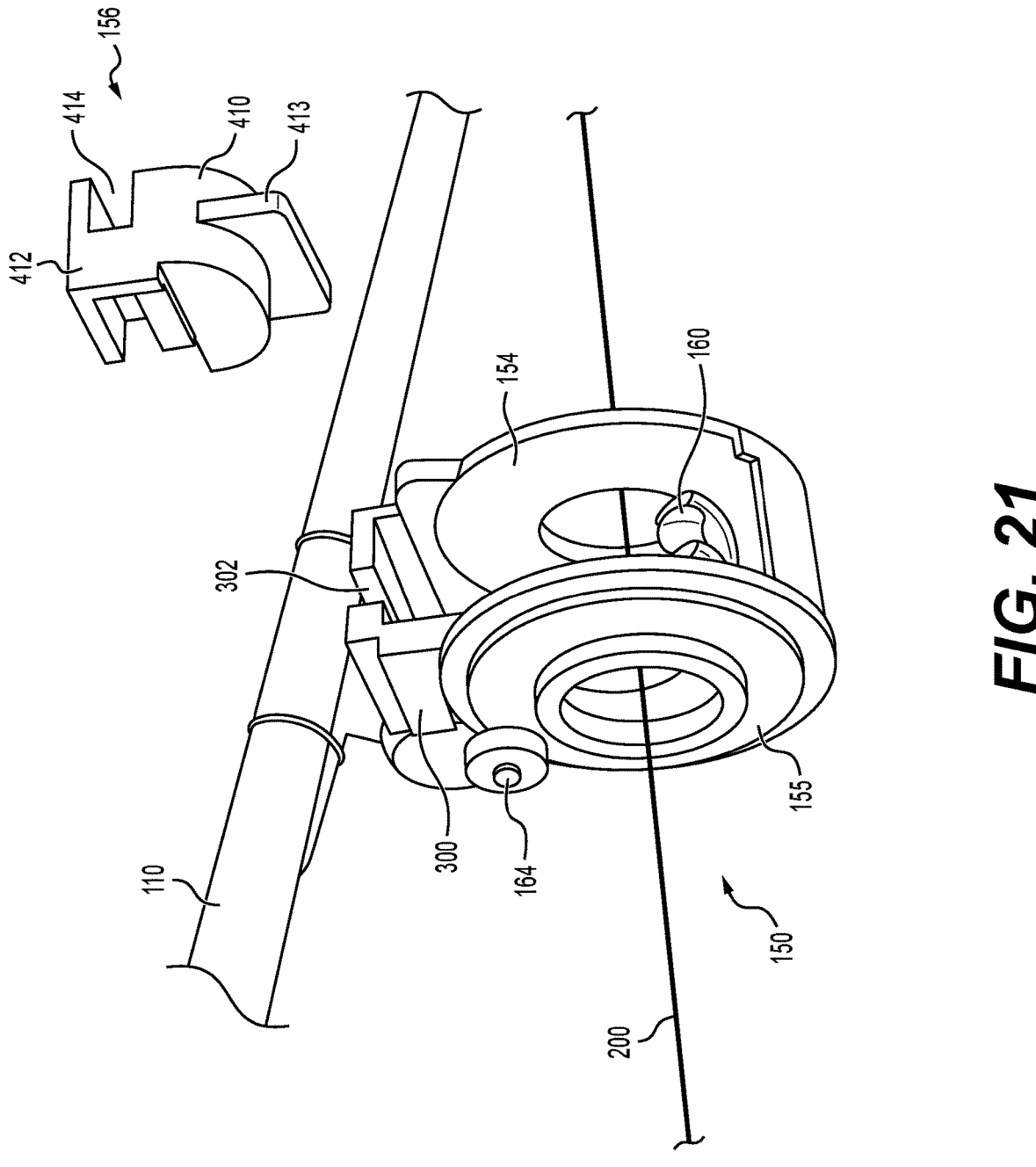
FIG. 21 is an isometric enlarged exploded view of a brake mechanism in an open or non-braking position in accordance with an alternative embodiment of the fishing line control system invention.
Figure 22:
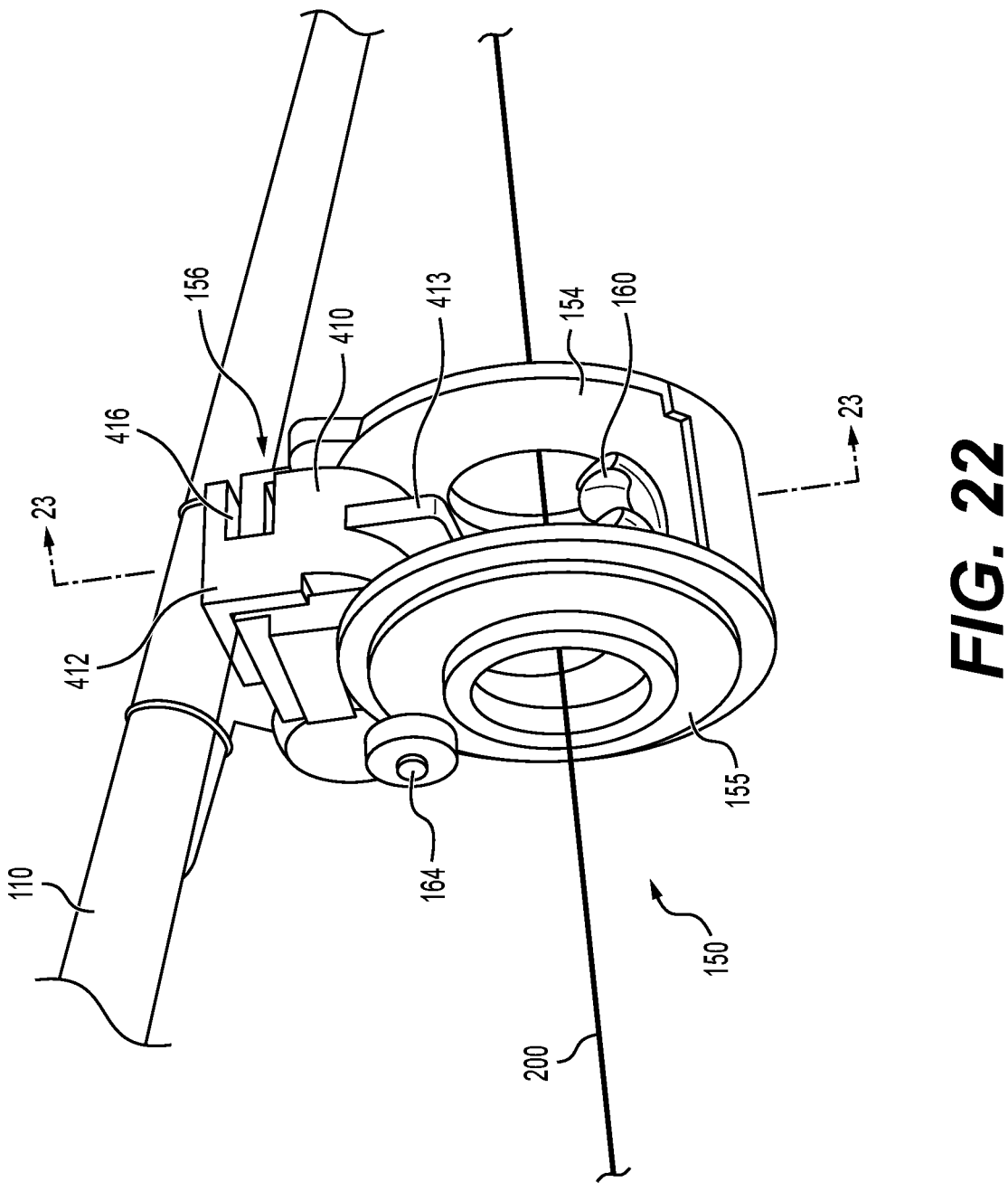
FIG. 22 is an isometric enlarged view of a brake mechanism shown in FIG. 21 having an installed base pad in an open or non-braking position.
Figure 23:
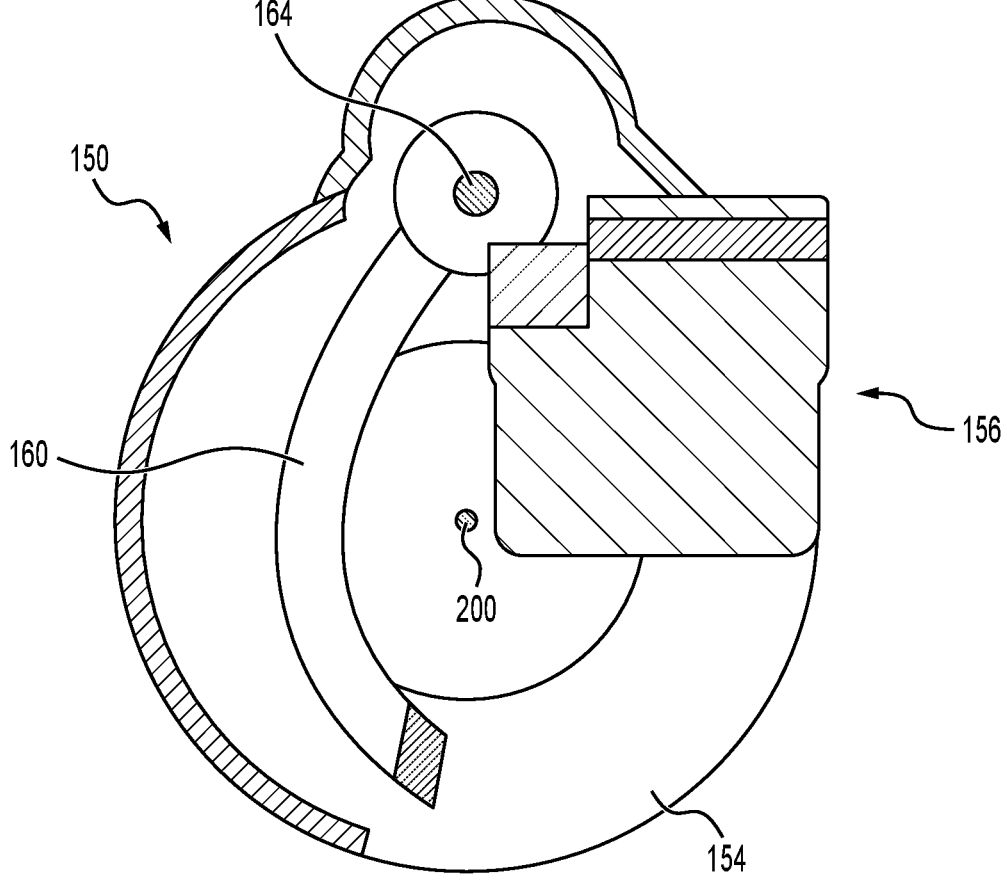
FIG. 23 is a cross-sectional side view of the brake mechanism shown in FIG. 22.

With reference to FIGS. 21-23, in which like reference characters refer to like elements in common with other embodiments, another alternative embodiment of the invention to that shown in FIGS. 15-19 is shown. In FIGS. 21-23, the brake mechanism 150 is shown in an open or non-braking position relative to the fishing line 200. The brake mechanism 150 may include a base pad connector 300 connected to the rod 110. The base pad connector 300 may include a base pad slot 302 configured to receive a complimentary shaped base pad 156. The base pad 156 may include a solid base pad head 410 connected to a base pad foot 412 by a base pad neck 414. A blade 413, which is thinner than the base pad head 410 and integral with the base pad head, may extend downward from the base pad head. The braking mechanism 150 may include a first closed loop structure 154 forming a first line guide and a second closed loop structure 155 forming a second line guide, both incorporated into a common housing. The first closed loop structure 154 may define a first opening and the second closed loop structure 155 may define a second opening, both configured to permit the fishing line 200 to pass freely therethrough. In the embodiment shown, the second opening is the same size as the first opening (e.g., for circular openings, the second opening has the same diameter as the first opening), and the second opening is distal from the reel 130 (FIG. 1) relative to the first opening. A braking arm 160 may be disposed with the common housing. The braking arm 160 may be pivotally mounted to the common housing at a pivot point 164. A bias device (not shown), such as a torsion spring, may be provided to bias the braking arm 160 into the position shown in FIGS. 21-23, i.e., away from, or out of contact with, the line braking surface.

Figure 24:
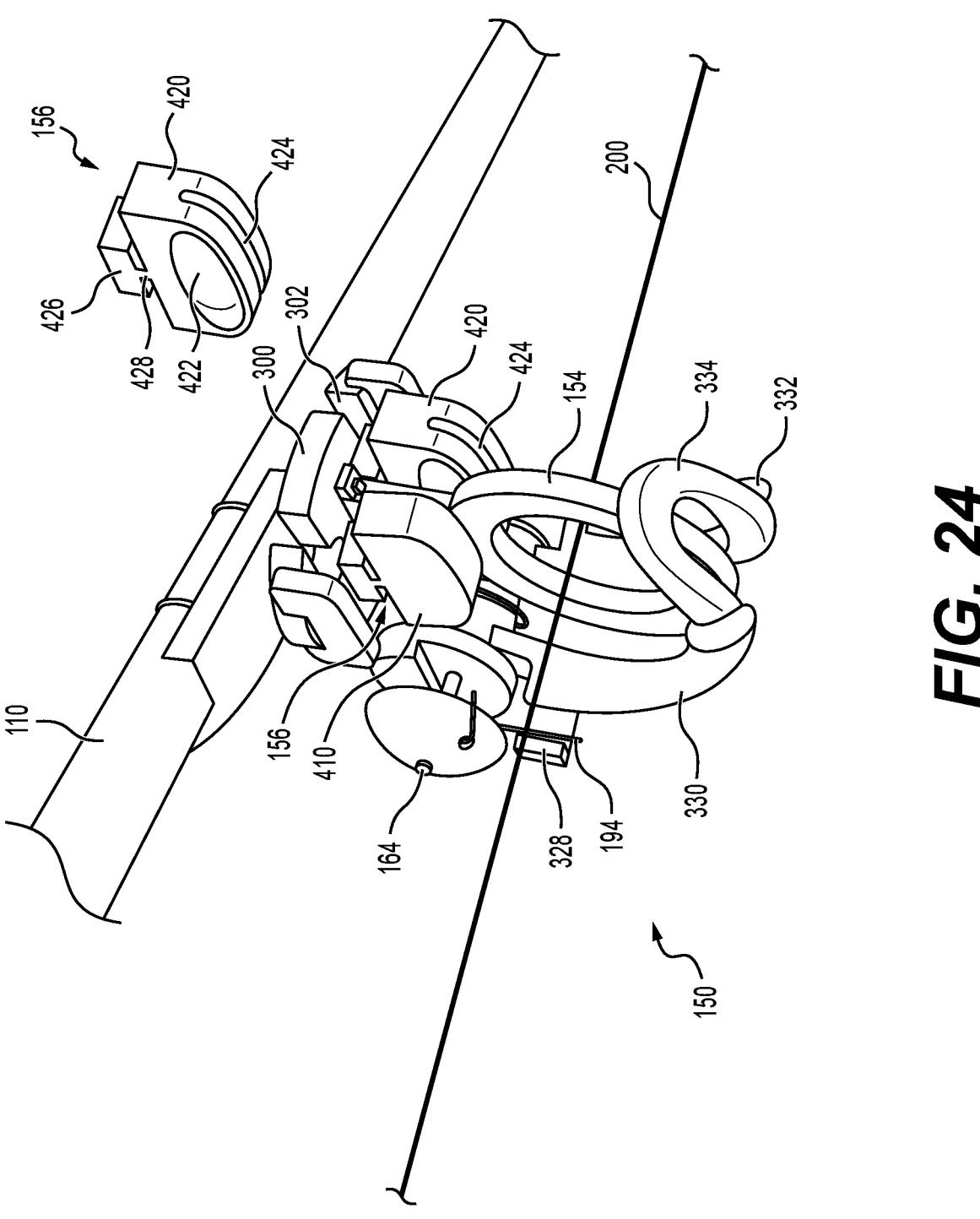
FIG. 24 is an isometric enlarged exploded view of a brake mechanism in an open or non-braking position in accordance with an alternative embodiment of the fishing line control system invention.

FIG. 24 illustrates another alternative embodiment of the present invention, in which like reference characters refer to like elements. The brake mechanism 150 in FIG. 24 is shown in an open or non-braking position and may include a base pad connector 300 connected to the rod 110. The closed loop structure 154 may extend downward from the base pad connector 300, and may define an opening configured to permit fishing line to pass freely therethrough. Two different types of base pads 156 may be disposed on opposite sides of the closed loop structure 154 via the base pad connector 300. A first base pad having a solid base pad head 410 may be disposed on one side (described above in connection with FIGS. 20 and 25), and a second base pad having a base pad head 420 with an oval-shaped opening 422 and a longitudinal recess 424 on its lower surface may be disposed on the opposite side. The second base pad head 420 may be connected to a base pad foot 426 by a base pad neck 428. The oval-shaped opening 422 may extend through the base pad head 420. The base pad head 420 may have a curved lower surface that is curved to generally match the curvature of the oval-shaped opening 422, and which includes a longitudinally extending central recess 424.

Curved inner and outer braking arms 320 and 322 may be pivotally mounted on and extend from the base pad connector 300 along a pivot axis 164. The inner and outer braking arms 320 and 322 may be connected together by a bridge 324 that is integrally formed with the braking arms. The bridge 324 may be generally U-shaped to accommodate the closed loop structure 154 during the pivoting motion of the inner and outer braking arms 320 and 322. Each base pad head 410 and 420 may have a curved lower surface shaped cooperatively to mate with, and/or have an inverse or negative image shape of, the curved inner surface of the inner and outer braking arms 320 and 322. Each base pad head 410 and 420 may be connected to a base pad foot that allows the foot to slide into, and seat securely within, complementarily shaped base pad slots 302 provided in the base pad connector 300. As a result, the base pads 156 may be easily removed for replacement with a new base pad, or exchanged with a different type of base pad in terms of material, size and/or shape.

Figure 26:
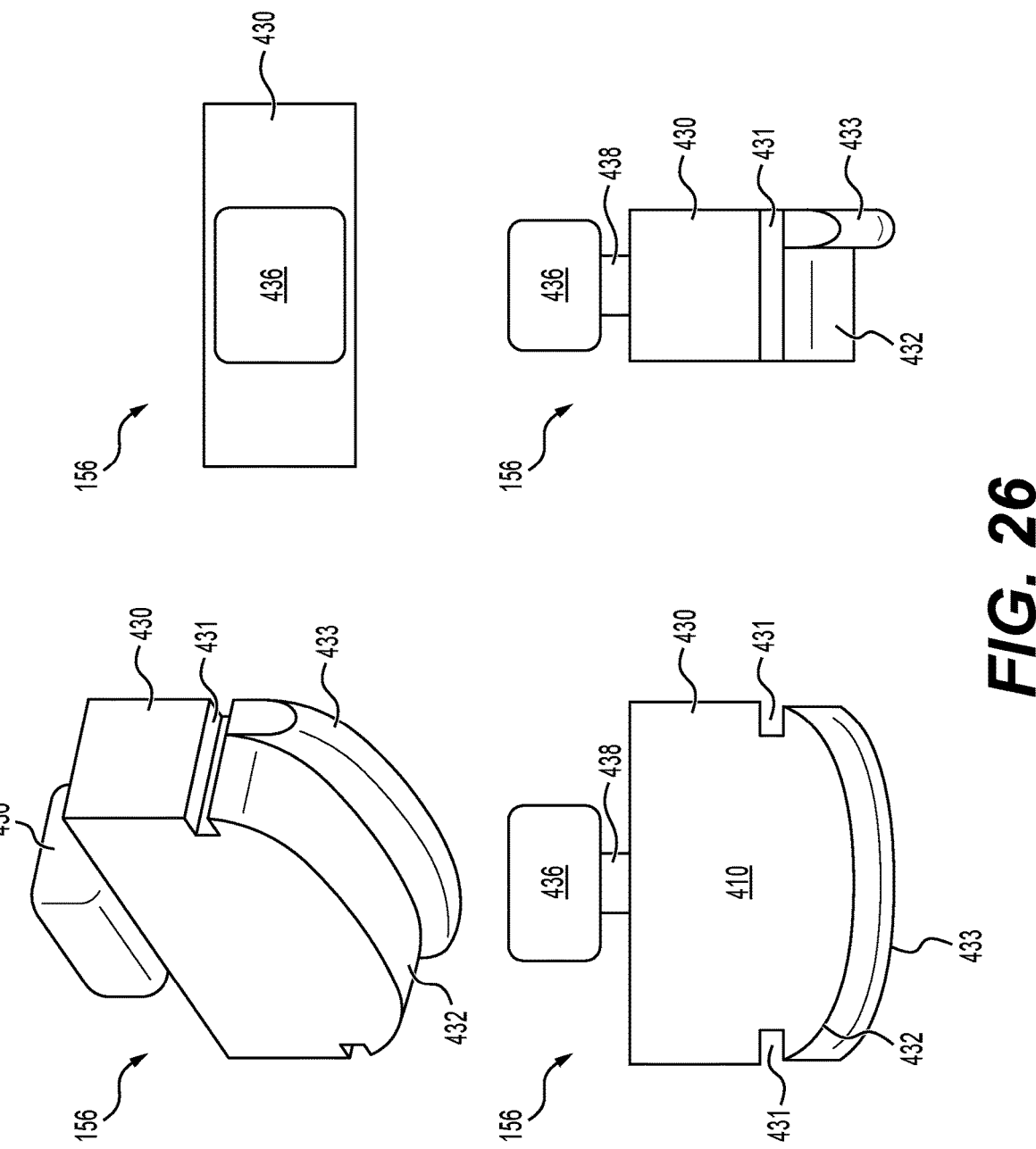
FIG. 26 are isometric, top, side and front views of an alternative base pad having a pad head with a stepped braking surface.

FIG. 26 illustrates an alternative base pad 156 having a solid base pad head 430 connected to a base pad foot 436 by a base pad neck 438. Opposing recesses 431 may be formed in the solid base pad head 430 at or near the endpoints of a curved lower surface 432. A curved rounded blade 433 may extend downward from the curved lower surface 432. The curved lower surface 432 and the curved rounded blade 433 may be integrally formed. The width of the curved rounded blade 433 may be substantially less than the width of the curved lower surface 432 and together the curved lower surface 432 and the curved rounded blade 433 may form a stepped lower surface. The size, shape an positions of the recesses 431 and curved rounded blade 433 may be varied in alternative embodiments of the invention without departing from the intended scope of the invention.

Figure 27:
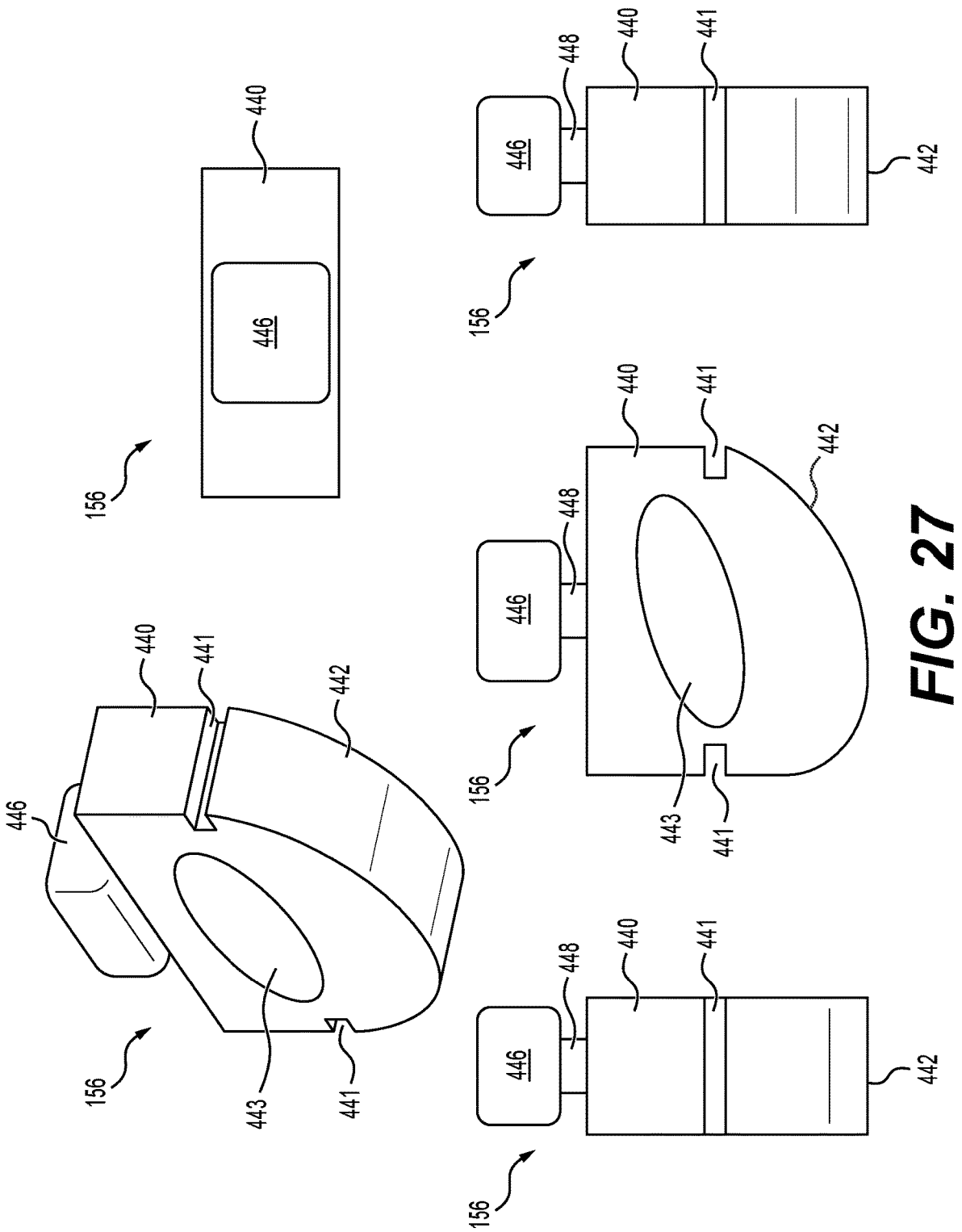
FIG. 27 are isometric, top, side and front views of an alternative base pad having a pad head with an asymmetrical braking surface.

FIG. 27 illustrates another alternative base pad 156 having a base pad head 440 connected to a base pad foot 446 by a base pad neck 448. An oval-shaped central opening 443 may extend through the base pad head 440. The central opening 443 may be canted relative to the upper surface of the base pad head 440. The base pad head 440 may have a curved lower surface 442 that is curved to generally match the curvature of the central opening 443. Opposing recesses 441 may be formed in the base pad head 440 at or near at least one endpoint of a curved lower surface 442. The size, shape and position of the central opening 443, the recesses 431, and the curved lower surface 442 may be varied in alternative embodiments of the invention without departing from the intended scope of the invention.

Figure 28:
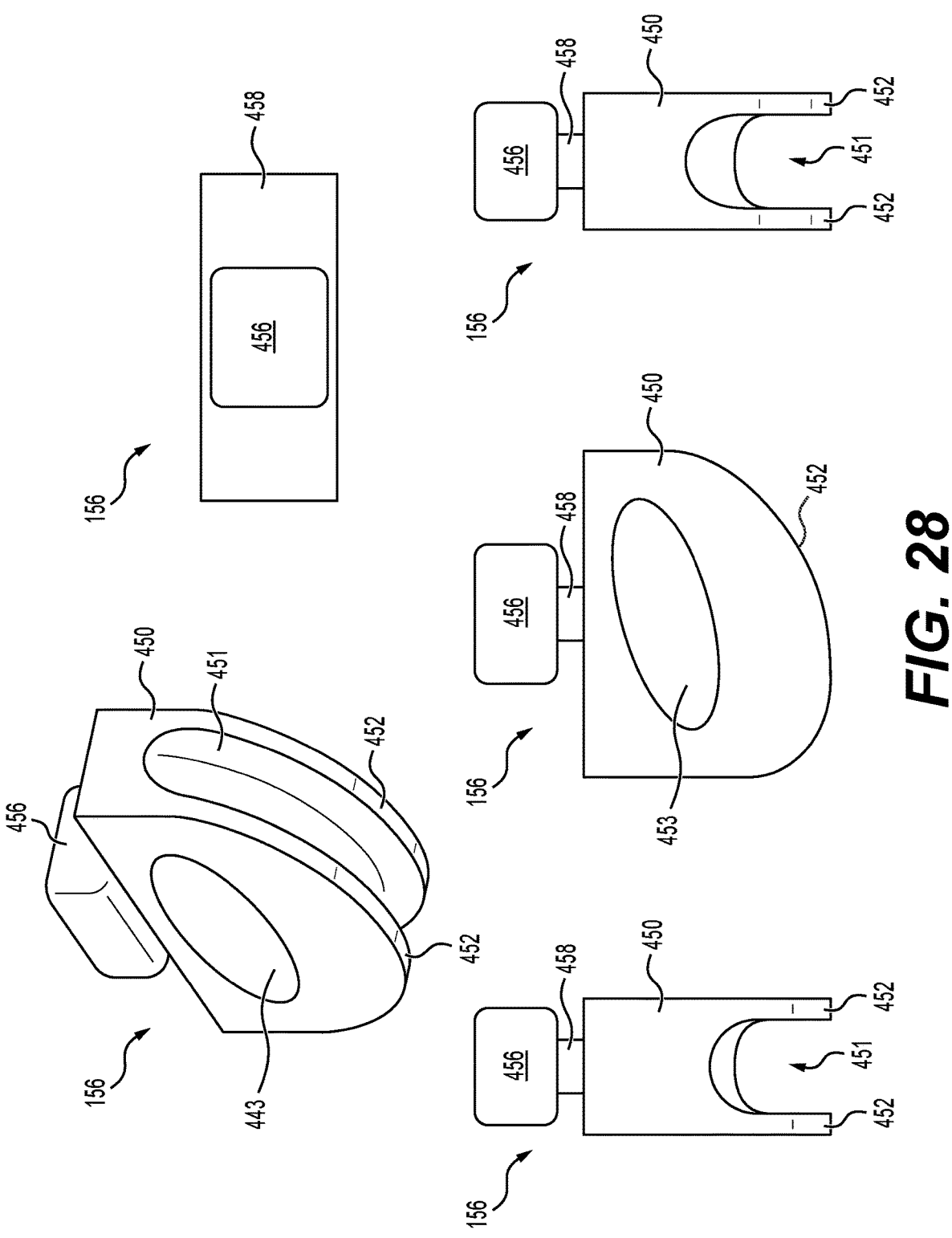
FIG. 28 are isometric, top, side and front views of an alternative base pad having a pad head with an asymmetrical and recessed braking surface.

FIG. 28 illustrates yet another alternative base pad 156 having a base pad head 450 connected to a base pad foot 456 by a base pad neck 458. An oval-shaped central opening 453 may extend through the base pad head 450. The central opening 453 may be canted relative to the upper surface of the base pad head 450. The base pad head 450 may have a curved lower surface 422 that is curved to generally match the curvature of the central opening 453, and which includes a central recess 451. The size, shape and position of the central opening 453, the recess 451, and the curved lower surface 452 may be varied in alternative embodiments of the invention without departing from the intended scope of the invention.

It is noted that the physical characteristics of the materials used to construct all of the base pads and braking surfaces 156 discussed herein include, without limitation, the materials described in connection with the FIGS. 15-19 embodiment. Further, the embodiments of the invention shown in FIGS. 15-28 may be operated as follows. The brake mechanism 150 may be maintained in the open, non-braking, position prior to and during the initial portion of a casting motion, for example. When the fisherman desires to begin impeding the passage of fishing line 200 from the reel 130 (FIG. 1), she may progressively depress the control mechanism (180, shown in FIGS. 1 and 12) causing the control wire to be pulled towards the control mechanism and away from the brake mechanism. In turn, the braking arm(s) 320/322/160 may pivot towards the one or more base pads 156 against the bias of the bias device 194. Contact between the braking arm(s) 320/322/160 directly, or through one or more intervening arm pads 500, and the fishing line 200, and contact between the fishing line and the base pads 156, may slow or stop line from passing through the brake mechanism 150. The control mechanism 150 may be selectively released, which in turn may result in the braking arm(s) 320/322/160 returning to their open position under the influence of the bias device 194.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. For example, the shapes and sizes of various elements of the embodiments of the invention may be changed without departing from the intended scope of the invention. Further, while a spin-casting reel is shown in FIG. 1, it is appreciated that embodiments of the invention may be used with other types of reels, including without limitation bait casting and closed faced reels. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed is:

1. A fishing system comprising:

a fishing rod;

a first line guide connected to the fishing rod in a fixed position relative to the fishing rod, said first line guide defining a first opening configured to permit a fishing line to pass freely therethrough;

a first braking arm disposed adjacent to the first line guide, said first braking arm extending from a pivot point connected to the fishing rod, said first braking arm having a surface configured to engage the fishing line, and said first braking arm being moveable relative to said first line guide and relative to the fishing rod;

a first removable base pad connected to the fishing rod and spaced from the first braking arm, said first removable base pad constructed of compressible material and having a base pad head;

a bias device configured to bias the first braking arm away from the first removable base pad; and a control mechanism configured to pivot the first braking arm about the pivot point towards the first removable base pad, wherein the first braking arm is configured to pivot within a first reference plane, and wherein the first removable base pad head has a surface that is curved within the first reference plane.

2. The system of claim 1 further comprising:

a second line guide defining a second opening configured to permit the fishing line to pass freely therethrough, said second guide line connected to the first line guide.

3. The system of claim 2 wherein the first line guide and the second line guide are incorporated into a common housing.

4. The system of claim 1 further comprising:

a compressible braking arm pad connected to the first braking arm, said braking arm pad configured to engage the fishing line.

5. The system of claim 1 further comprising:

a second braking arm disposed on an opposite side of the first line guide from the first braking arm, said second braking arm having a surface configured to engage the fishing line, and said second braking arm being moveable relative to said first line guide and relative to the fishing rod; and a second removable base pad spaced from the second braking arm, said second removable base pad constructed of compressible material, wherein the control mechanism is configured to pivot the second braking arm towards the second removable base pad.

6. The system of claim 5 wherein the first base pad and the second base pad are identical in terms of material, shape and size.

7. The system of claim 5 wherein the first base pad and the second base pad are different in terms of material, shape or size.

8. The system of claim 1, wherein the first braking arm and the first base pad have complementary nesting curved surfaces in the first reference plane.

9. The system of claim 1, wherein the first base pad includes a base pad head having a central opening.

10. The system of claim 1, wherein the first base pad includes a solid base pad head.

11. The system of claim 1, wherein the first base pad includes a base pad head having a central recess extending longitudinally along a lower surface of the base pad head.

12. The system of claim 1 further comprising a base pad connector connected to the fishing rod, said base pad connector having an opening provided therein for securely receiving a portion of the first removable base pad.

13. A fishing line control system for installation on a fishing rod, said system comprising:

a base pad connector configured to be connected to the fishing rod;

a first line guide extending away from the base pad connector, said first line guide defining a first opening configured to permit a fishing line to pass freely therethrough;

a first braking arm disposed adjacent to the first line guide, said first braking arm extending from a pivot point connected to the base pad connector, said first braking arm having a surface configured to engage the fishing line, and said first braking arm being moveable relative to said first line guide;

a first removable base pad connected to the base pad connector and spaced from the first braking arm, said first removable base pad constructed of compressible material and having a base pad head;

a bias device configured to bias the first braking arm away from the first removable base pad; and a control mechanism configured to pivot the first braking arm about the pivot point towards the first removable base pad, wherein the first braking arm is configured to pivot within a first reference plane, and wherein the first removable base pad head has a surface that is curved within the first reference plane.

14. The system of claim 13 further comprising:

a second line guide defining a second opening configured to permit the fishing line to pass freely therethrough, said second guide line connected to the first line guide.

15. The system of claim 13 further comprising:

a compressible braking arm pad connected to the first braking arm, said braking arm pad configured to engage the fishing line.

16. The system of claim 13 further comprising:

a second braking arm disposed on an opposite side of the first line guide from the first braking arm, said second braking arm having a surface configured to engage the fishing line, and said second braking arm being moveable relative to said first line guide; and a second removable base pad spaced from the second braking arm, said second removable base pad constructed of compressible material, wherein the control mechanism is configured to pivot the second braking arm towards the second removable base pad.

17. The system of claim 16 wherein the first base pad and the second base pad are identical in terms of material, shape and size.

18. The system of claim 16 wherein the first base pad and the second base pad are different in terms of material, shape or size.

19. The system of claim 13, wherein the first braking arm and the first base pad have complementary nesting curved surfaces.

20. The system of claim 13 wherein the first braking arm includes a hard polished plastic, ceramic or composite material surface configured to engage the fishing line.

* * * * *